(12) United States Patent
Xu et al.

(10) Patent No.: US 12,192,586 B2
(45) Date of Patent: Jan. 7, 2025

(54) METHOD FOR PRESENTING FACE IN VIDEO CALL, VIDEO CALL APPARATUS, AND VEHICLE

(71) Applicant: Huawei Technologies Co., Ltd., Shenzhen (CN)

(72) Inventors: Wenkang Xu, Shenzhen (CN); Wei Huang, Munich (DE); Junhao Zhang, Shanghai (CN); Xiaolin Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 17/708,876

(22) Filed: Mar. 30, 2022

(65) Prior Publication Data

US 2022/0224860 A1    Jul. 14, 2022

Related U.S. Application Data

(63) Continuation of application No. PCT/CN2020/094090, filed on Jun. 3, 2020.

(30) Foreign Application Priority Data

Sep. 30, 2019  (CN) .......................... 201910944612.9

(51) Int. Cl.
*H04N 21/4788*  (2011.01)
*G06T 7/40*  (2017.01)
(Continued)

(52) U.S. Cl.
CPC ........... *H04N 21/4788* (2013.01); *G06T 7/40* (2013.01); *G06T 19/20* (2013.01); *G06V 10/143* (2022.01);
(Continued)

(58) Field of Classification Search
CPC ...... H04N 21/4788; H04N 7/157; H04N 7/15; G06T 7/40; G06T 19/20;
(Continued)

(56) References Cited

U.S. PATENT DOCUMENTS 8,811,744 B2   8/2014 Hong et al.
10,091,412 B1  10/2018 Feng et al.
(Continued)

FOREIGN PATENT DOCUMENTS

CN           1774726 A     5/2006
CN         101354795 A     1/2009
(Continued)

*Primary Examiner* — Yosef K Laekemariam
(74) *Attorney, Agent, or Firm* — Conley Rose, P.C.

(57) ABSTRACT

A method for presenting a face in a video call includes: obtaining a key feature point of a facial expression of a user based on a face image of the user; driving a three-dimensional (3D) head image of the user by using the key feature point of the facial expression of the user, to obtain a target 3D avatar of the user, where the target 3D avatar of the user has an expression of the user; rotating the target 3D avatar based on a preset presentation angle, to obtain a target 3D avatar at the preset presentation angle; and transmitting the target 3D avatar at the preset presentation angle to a peer video call device. A user can see a 3D avatar that is of a user and that is at a preset presentation angle in real time.

21 Claims, 14 Drawing Sheets

(51) Int. Cl.
*G06T 19/20* (2011.01)
*G06V 10/143* (2022.01)
*G06V 10/56* (2022.01)
*G06V 10/82* (2022.01)
*G06V 20/59* (2022.01)
*G06V 40/16* (2022.01)
*H04N 7/15* (2006.01)
*G06V 20/58* (2022.01)

(52) U.S. Cl.
CPC .............. *G06V 10/56* (2022.01); *G06V 10/82* (2022.01); *G06V 40/166* (2022.01); *G06V 40/168* (2022.01); *G06V 40/174* (2022.01); *H04N 7/157* (2013.01); *G06T 2207/10024* (2013.01); *G06T 2207/10028* (2013.01); *G06T 2207/30201* (2013.01); *G06T 2219/2016* (2013.01); *G06V 20/58* (2022.01); *G06V 20/59* (2022.01)

(58) Field of Classification Search
CPC ........... G06T 2207/10024; G06T 2207/10028; G06V 10/143; G06V 10/56; G06V 10/82; G06V 40/16; G06V 40/168; G06V 40/174; G06V 20/59; G06V 40/166
See application file for complete search history.

(56) References Cited

U.S. PATENT DOCUMENTS

| | | | |
|---|---|---|---|
| 2006/0017804 A1 | 1/2006 | Lee et al. | |
| 2009/0153671 A1* | 6/2009 | Lee | G06F 3/0304 |
| | | | 348/207.1 |
| 2014/0002586 A1 | 1/2014 | Nourbakhsh | |
| 2014/0160123 A1 | 6/2014 | Yang et al. | |
| 2015/0035954 A1 | 2/2015 | Hoffman et al. | |
| 2015/0213604 A1* | 7/2015 | Li | G06T 13/80 |
| | | | 345/473 |
| 2017/0039752 A1 | 2/2017 | Quinn et al. | |
| 2017/0374278 A1 | 12/2017 | Zhao | |
| 2018/0239553 A1 | 8/2018 | Lan et al. | |
| 2019/0197330 A1 | 6/2019 | Mahmoud et al. | |

FOREIGN PATENT DOCUMENTS

| | | | | |
|---|---|---|---|---|
| CN | 101452582 | A | 6/2009 | |
| CN | 101739712 | A | 6/2010 | |
| CN | 104065911 | A | 9/2014 | |
| CN | 104349152 | A | 2/2015 | |
| CN | 104935860 | A | 9/2015 | |
| CN | 105144247 | A | 12/2015 | |
| CN | 105787884 | A | 7/2016 | |
| CN | 105812708 | A | 7/2016 | |
| CN | 105825544 | A | 8/2016 | |
| CN | 106331572 | A | 1/2017 | |
| CN | 106488168 | A | 3/2017 | |
| CN | 106557730 | A | 4/2017 | |
| CN | 108470373 | A | 8/2018 | |
| CN | 109151540 | * | 1/2019 | ............... G06K 9/00 |
| CN | 109151540 | A | 1/2019 | |
| CN | 109584358 | A | 4/2019 | |
| CN | 109903368 | A | 6/2019 | |
| WO | 2019177870 | A1 | 9/2019 | |

* cited by examiner

METHOD FOR PRESENTING FACE IN VIDEO CALL, VIDEO CALL APPARATUS, AND VEHICLE

CROSS-REFERENCE TO RELATED APPLICATIONS

This is a continuation of International Patent Application No. PCT/CN2020/094090 filed on Jun. 3, 2020, which claims priority to Chinese Patent Application No. 201910944612.9 filed on Sep. 30, 2019. The disclosures of the aforementioned applications are hereby incorporated by reference in their entireties.

TECHNICAL FIELD

The present application relates to the field of artificial intelligence, and in particular, to a method for presenting a face in a video call, a video call apparatus, and a vehicle.

BACKGROUND

Artificial intelligence (AI) is a theory, a method, a technology, or an application system that simulates, extends, and expands human intelligence by using a digital computer or a machine controlled by the digital computer, to perceive an environment, obtain knowledge, and achieve an optimal result based on the knowledge. In other words, artificial intelligence is a branch of computer science, and is intended to understand essence of intelligence and produce a new intelligent machine that can react in a manner similar to human intelligence. Artificial intelligence means studying design principles and implementation methods of various intelligent machines, so that the machines have perceiving, inference, and decision-making functions. Researches in the field of artificial intelligence include researches on robots, natural language processing, computer vision, decision-making and inference, human-machine interaction, recommendation and search, AI basic theories, and the like.

Autonomous driving is a mainstream application in the field of artificial intelligence. The autonomous driving technology depends on computer vision, a radar, a monitoring apparatus, a global positioning system, and the like that collaborate with each other, to implement autonomous driving of a motor vehicle without human intervention. An autonomous vehicle uses various computing systems to assist in transporting passengers from one location to another location. Some autonomous vehicles may require some initial or continuous input from operators (such as navigators, drivers, or passengers). An autonomous vehicle allows an operator to switch from a manual operation mode to an autonomous driving mode or allows a mode between the manual operation mode and the autonomous driving mode. Because the autonomous driving technology does not require a human to drive a motor vehicle, can theoretically avoid human driving mistakes effectively, reduce traffic accidents, and improve road transportation efficiency, the autonomous driving technology attracts increasing attention.

In a survey of 2,000 people, American Telephone and Telegraph Co. (AT&T) found that approximately 10% of drivers use mobile phones to make video calls during driving. For a widely used in-vehicle video call means, a video call presentation effect, especially an angle of view, is greatly affected by a driving environment. For example, an angle of view used to present an image of a driver that is displayed at the other end of a remote conference is closely related to a location of a video call apparatus (such as a mobile phone) of the driver, and with bumping of a vehicle, the video call apparatus greatly affects an image presentation effect and video conference experience.

SUMMARY

Embodiments of the present application provide a method for presenting a face in a video call, a video call apparatus, and a vehicle. According to the embodiments of the present application, during a video call, a peer user can see a three-dimensional (3D) avatar that is of a user and that is at a preset presentation angle in real time, to improve the video call experience.

According to a first aspect, an embodiment of the present application provides a method for presenting a face in a video call, including obtaining a key feature point of a facial expression of a user based on a face image of the user in a video call process, driving a 3D head image of the user by using the key feature point of the facial expression of the user, to obtain a target 3D avatar of the user, where the target 3D avatar of the user has an expression of the user, rotating the target 3D avatar based on a preset target presentation angle, to obtain a target 3D avatar at the preset presentation angle, and sending the target 3D avatar at the preset presentation angle to a peer video call device.

During a video call, the 3D head avatar of the user is driven based on the key feature point that is of the facial expression of the user and that is obtained based on the face image of the user in the video call process, so that a video peer user can see an expression of the user in real time, and the 3D avatar that is of the user and that is at the preset presentation angle is obtained, and the obtained 3D avatar at the preset presentation angle is sent to the peer video call device, so that a peer user can see the head image that is of the user and that is at the preset angle, to improve the video call experience.

In a feasible embodiment, the method in the present application further includes constructing the 3D head image of the user based on the face image of the user.

In a feasible embodiment, the face image of the user includes N infrared images of the user, and N is an integer greater than 0, and constructing the 3D head image of the user based on the face image of the user includes obtaining first 3D head point cloud information of the user based on the N infrared images of the user, and constructing the 3D head image of the user based on the first 3D head point cloud information of the user.

In a feasible embodiment, the face image of the user includes N infrared images of the user and a color face image of the user, and N is an integer greater than 0, and constructing the 3D head image of the user based on the face image of the user includes obtaining second 3D head point cloud information of the user based on the N infrared images of the user and the color face image of the user, and constructing the 3D head image of the user based on the second 3D head point cloud information of the user.

In a feasible embodiment, the face image of the user further includes the color face image of the user, and the method in the present application further includes obtaining a face texture feature of the user based on the color face image of the user, and constructing the 3D head image of the user based on the 3D head point cloud information of the user includes constructing the 3D head image of the user based on the 3D head point cloud information of the user and the face texture feature of the user, where the 3D head image of the user is a color image, and the 3D head point cloud information of the user includes the first 3D head point cloud information of the user or the second 3D head point cloud information of the user.

In a feasible embodiment, the face image of the user includes N infrared images of the user and a color face image of the user, and constructing the 3D head image of the user based on the face image of the user includes inputting the color face image of the user and the N infrared images of the user into a feature extraction model for calculation, to obtain 3D head point cloud information of the user and a face texture feature of the user, and constructing the 3D head image of the user based on the 3D head point cloud information of the user and the face texture feature of the user, where the 3D head image of the user is a color image.

Compared with the 3D head image that is of the user and that is constructed based on the 3D head point cloud information obtained based on the infrared images, the 3D head image that is of the user and that is constructed based on the 3D head point cloud information and the face texture feature that are obtained based on the color face image of the user and the infrared images presents more and clearer face details of the user. This improves user experience in a video call or a video conference.

In a feasible embodiment, the feature extraction model includes a 3D head feature extraction network and a texture feature extraction network, and inputting the color face image of the user and the N infrared images of the user into a feature extraction model for calculation, to obtain 3D head point cloud information of the user and a face texture feature of the user includes inputting the color face image of the user and the N infrared images of the user into the 3D head feature extraction network for calculation, to obtain the 3D head point cloud information of the user, and inputting the color face image of the user into the texture feature extraction network for calculation, to obtain the face texture feature of the user.

In a feasible embodiment, the 3D head feature extraction network is a neural network that uses an encoder-decoder architecture, and inputting the color face image of the user and the N infrared images of the user into the 3D head feature extraction network for calculation, to obtain the 3D head point cloud information of the user includes obtaining N image pairs based on the color face image of the user and the N infrared images of the user, where each of the N image pairs includes a color image and an infrared image of the user, the color image in the N image pairs is the color face image of the user, and infrared images in the N image pairs are respectively from the N infrared images of the user, and inputting the N image pairs into the neural network with the encoder-decoder architecture for calculation, to obtain the 3D head point cloud information of the user.

In a feasible embodiment, the preset presentation angle is obtained based on the N infrared images of the user.

In a feasible embodiment, the method in the present application further includes obtaining the 3D head image of the user based on a color depth image, and obtaining the 3D head image of the user based on a color depth image includes obtaining 3D head point cloud information of the user and a face texture feature of the user based on the color depth image, and constructing the 3D head image of the user based on the 3D head point cloud information of the user and the face texture feature of the user, where the 3D head image of the user is a color image.

In a feasible embodiment, the preset presentation angle is obtained based on the color depth image.

In a feasible embodiment, in a video call process, a plurality of infrared images of the user are obtained in real time, 3D head point cloud information of the user is obtained based on the plurality of infrared images of the user, and then the 3D head image of the user is constructed based on the 3D head point cloud information of the user and the previously obtained 3D head point cloud information of the user. According to the solution in this embodiment, the 3D head image of the user is constructed by continuously obtaining the infrared images of the user, to optimize the 3D head image of the user, so as to improve user experience in a video call.

According to a second aspect, an embodiment of the present application further provides a video call apparatus, including an obtaining unit configured to obtain a key feature point of a facial expression of a user based on a face image of the user in a video call process, a drive unit configured to drive a 3D head image of the user by using the key feature point of the facial expression of the user, to obtain a target 3D avatar of the user, where the target 3D avatar of the user has an expression of the user, a rotation unit configured to rotate the target 3D avatar based on a preset presentation angle, to obtain a target 3D avatar at the preset presentation angle, and a sending unit configured to send the target 3D avatar at the preset presentation angle to a peer video call device.

In a feasible embodiment, the video call apparatus further includes a construction unit configured to construct the 3D head image of the user based on the face image of the user.

In a feasible embodiment, the face image of the user includes N infrared images of the user, and N is an integer greater than 0, and the construction unit is further configured to obtain first 3D head point cloud information of the user based on the N infrared images of the user, and construct the 3D head image of the user based on the first 3D head point cloud information of the user.

In a feasible embodiment, the face image of the user includes N infrared images of the user and a color face image of the user, and N is an integer greater than 0, and the construction unit is further configured to obtain second 3D head point cloud information of the user based on the N infrared images of the user and the color face image of the user, and construct the 3D head image of the user based on the second 3D head point cloud information of the user.

In a feasible embodiment, the face image of the user further includes the color face image of the user.

The obtaining unit is further configured to obtain a face texture feature of the user based on the color face image of the user.

The construction unit is further configured to construct the 3D head image of the user based on the 3D head point cloud information of the user and the face texture feature of the user, where the 3D head image of the user is a color image, and the 3D head point cloud information of the user includes the first 3D head point cloud information of the user or the second 3D head point cloud information of the user.

In a feasible embodiment, the face image of the user includes N infrared images of the user and a color head image of the user, and the construction unit is further configured to input the color head image of the user and the N infrared images of the user into a feature extraction model for calculation, to obtain 3D head point cloud information of the user and a face texture feature of the user, and construct the 3D head image of the user based on the 3D head point cloud information of the user and the face texture feature of the user, where the 3D head image of the user is a color image.

In a feasible embodiment, the feature extraction model includes a 3D head feature extraction network and a texture feature extraction network, and in an aspect of inputting the color head image of the user and the N infrared images of the user into a feature extraction model for calculation, to obtain 3D head point cloud information of the user and a face texture feature of the user, the construction unit is further configured to input the color face image of the user and the N infrared images of the user into the 3D head feature extraction network for calculation, to obtain the 3D head point cloud information of the user, and input the color face image of the user into the texture feature extraction network for calculation, to obtain the face texture feature of the user.

In a feasible embodiment, the 3D head feature extraction network is a neural network that uses an encoder-decoder architecture, and in an aspect of inputting the color head image of the user and the N infrared images of the user into the 3D head feature extraction network for calculation, to obtain the 3D head point cloud information of the user, the construction unit is further configured to obtain N image pairs based on the color face image of the user and the N infrared images of the user, where each of the N image pairs includes a color image and an infrared image of the user, the color image in the N image pairs is the color face image of the user, and infrared images in the N image pairs are respectively from the N infrared images of the user, and input the N image pairs into the neural network with the encoder-decoder architecture for calculation, to obtain the 3D head point cloud information of the user.

In a feasible embodiment, the preset presentation angle is obtained based on the N infrared images of the user.

In a feasible embodiment, the face image of the user is a color depth image, and the obtaining unit is further configured to obtain the 3D head image of the user based on the color depth image.

In an aspect of obtaining the 3D head image of the user based on the color depth image, the construction unit is further configured to obtain 3D head point cloud information of the user and a face texture feature of the user based on the color depth image, and construct the 3D head image of the user based on the 3D head point cloud information of the user and the face texture feature of the user, where the 3D head image of the user is a color image.

In a feasible embodiment, the preset presentation angle is obtained based on the color depth image.

According to a third aspect, an embodiment of the present application provides a vehicle. The vehicle includes a video call system, the video call system includes a processor and a communications apparatus, and the processor is connected to the communications apparatus.

The processor is configured to obtain a key feature point of a facial expression of a user based on a face image of the user in a video call process, drive a 3D head image of the user by using the key feature point of the facial expression of the user, to obtain a target 3D avatar of the user, where the target 3D avatar of the user has an expression of the user, rotate the target 3D avatar based on a preset presentation angle, to obtain a target 3D avatar at the preset presentation angle, and transmit the target 3D avatar at the preset presentation angle to the communications apparatus.

The communications apparatus is configured to send the target 3D avatar at the preset presentation angle to a peer video call device.

In a feasible embodiment, the processor is further configured to construct the 3D head image of the user based on the face image of the user.

In a feasible embodiment, the face image of the user includes N infrared images of the user, and N is an integer greater than 0, and in an aspect of constructing the 3D head image of the user based on the face image of the user, the processor is further configured to obtain first 3D head point cloud information of the user based on the N infrared images of the user, and construct the 3D head image of the user based on the first 3D head point cloud information of the user.

In a feasible embodiment, the face image of the user includes N infrared images of the user and a color face image of the user, and N is an integer greater than 0, and in an aspect of constructing the 3D head image of the user based on the face image of the user, the processor is further configured to obtain second 3D head point cloud information of the user based on the N infrared images of the user and the color face image of the user, and construct the 3D head image of the user based on the second 3D head point cloud information of the user.

In a feasible embodiment, the face image of the user further includes the color face image of the user, and the processor is further configured to obtain a face texture feature of the user based on the color face image of the user.

In an aspect of constructing the 3D head image of the user based on the face image of the user, the processor is further configured to construct the 3D head image of the user based on the 3D head point cloud information of the user and the face texture feature of the user, where the 3D head image of the user is a color image, and the 3D head point cloud information of the user includes the first 3D head point cloud information of the user or the second 3D head point cloud information of the user.

In a feasible embodiment, the face image of the user includes N infrared images of the user and a color face image of the user, and in an aspect of constructing the 3D head image of the user based on the face image of the user, the processor is further configured to input the color face image of the user and the N infrared images of the user into a feature extraction model for calculation, to obtain 3D head point cloud information of the user and a face texture feature of the user, and construct the 3D head image of the user based on the 3D head point cloud information of the user and the face texture feature of the user, where the 3D head image of the user is a color image.

In a feasible embodiment, the feature extraction model includes a 3D head feature extraction network and a texture feature extraction network, and in an aspect of inputting the color face image of the user and the N infrared images of the user into a feature extraction model for calculation, to obtain 3D head point cloud information of the user and a face texture feature of the user, the processor is further configured to input the color face image of the user and the N infrared images of the user into the 3D head feature extraction network for calculation, to obtain the 3D head point cloud information of the user, and input the color face image of the user into the texture feature extraction network for calculation, to obtain the face texture feature of the user.

In a feasible embodiment, the 3D head feature extraction network is a neural network that uses an encoder-decoder architecture, and in an aspect of inputting the color face image of the user and the N infrared images of the user into the 3D head feature extraction network for calculation, to obtain the 3D head point cloud information of the user, the processor is further configured to obtain N image pairs based on the color face image of the user and the N infrared images of the user, where each of the N image pairs includes a color image and an infrared image of the user, the color image in the N image pairs is the color face image of the user, and infrared images in the N image pairs are respectively from the N infrared images of the user, and input the N image pairs into the neural network with the encoder-decoder architecture for calculation, to obtain the 3D head point cloud information of the user.

In a feasible embodiment, the preset presentation angle is obtained based on the N infrared images of the user.

In a feasible embodiment, the video call system further includes an infrared camera, and the infrared camera is connected to the processor.

The infrared camera is configured to obtain the N infrared images of the user, and transmit the N infrared images of the user to the processor.

In a feasible embodiment, the processor is further configured to obtain the 3D head image of the user based on a color depth image.

In an aspect of obtaining the 3D head image of the user based on a color depth image, the processor is further configured to obtain 3D head point cloud information of the user and a face texture feature of the user based on the color depth image, and construct the 3D head image of the user based on the 3D head point cloud information of the user and the face texture feature of the user, where the 3D head image of the user is a color image.

In a feasible embodiment, the preset presentation angle is obtained based on the color depth image.

In a feasible embodiment, the video call system further includes a depth camera, and the depth camera is connected to the processor.

The depth camera is configured to obtain the color depth image, and transmit the color depth image to the processor.

According to a fourth aspect, an embodiment of the present application provides a system. The system includes a vehicle and a server, the vehicle includes a video call system, and the video call system includes a processor and a communications apparatus.

The server is configured to obtain a 3D head image of a user based on a face image of the user.

The communications apparatus is configured to obtain the 3D head image of the user from the server, and transmit the 3D head image of the user to the processor.

The processor is configured to obtain a key feature point of a facial expression of the user based on the face image of the user in a video call process, drive the 3D head image of the user by using the key feature point of the facial expression of the user, to obtain a target 3D avatar of the user, where the target 3D avatar of the user has an expression of the user, rotate the target 3D avatar based on a preset presentation angle, to obtain a target 3D avatar at the preset presentation angle, and transmit the target 3D avatar at the preset presentation angle to the communications apparatus.

The communications apparatus is configured to send the target 3D avatar at the preset presentation angle to a peer video call device.

In a feasible embodiment, the server is further configured to construct the 3D head image of the user based on the face image of the user.

In a feasible embodiment, the face image of the user includes N infrared images of the user, and N is an integer greater than 0, and in an aspect of constructing the 3D head image of the user based on the face image of the user, the server is further configured to obtain first 3D head point cloud information of the user based on the N infrared images of the user, and construct the 3D head image of the user based on the first 3D head point cloud information of the user.

In a feasible embodiment, the face image of the user includes N infrared images of the user and a color face image of the user, and N is an integer greater than 0, and in an aspect of constructing the 3D head image of the user based on the face image of the user, the server is further configured to obtain second 3D head point cloud information of the user based on the N infrared images of the user and the color face image of the user, and construct the 3D head image of the user based on the second 3D head point cloud information of the user.

In a feasible embodiment, the face image of the user further includes the color face image of the user, and the processor is further configured to obtain a face texture feature of the user based on the color face image of the user.

In an aspect of constructing the 3D head image of the user based on the face image of the user, the server is further configured to construct the 3D head image of the user based on the 3D head point cloud information of the user and the face texture feature of the user, where the 3D head image of the user is a color image, and the 3D head point cloud information of the user includes the first 3D head point cloud information of the user or the second 3D head point cloud information of the user.

In a feasible embodiment, the face image of the user includes N infrared images of the user and a color face image of the user, and in an aspect of constructing the 3D head image of the user based on the face image of the user, the server is further configured to input the color face image of the user and the N infrared images of the user into a feature extraction model for calculation, to obtain 3D head point cloud information of the user and a face texture feature of the user, and construct the 3D head image of the user based on the 3D head point cloud information of the user and the face texture feature of the user, where the 3D head image of the user is a color image.

In a feasible embodiment, the feature extraction model includes a 3D head feature extraction network and a texture feature extraction network, and in an aspect of inputting the color face image of the user and the N infrared images of the user into a feature extraction model for calculation, to obtain 3D head point cloud information of the user and a face texture feature of the user, the server is further configured to input the color face image of the user and the N infrared images of the user into the 3D head feature extraction network for calculation, to obtain the 3D head point cloud information of the user, and input the color face image of the user into the texture feature extraction network for calculation, to obtain the face texture feature of the user.

In a feasible embodiment, the 3D head feature extraction network is a neural network that uses an encoder-decoder architecture, and in an aspect of inputting the color face image of the user and the N infrared images of the user into the 3D head feature extraction network for calculation, to obtain the 3D head point cloud information of the user, the server is further configured to obtain N image pairs based on the color face image of the user and the N infrared images of the user, where each of the N image pairs includes a color image and an infrared image of the user, the color image in the N image pairs is the color face image of the user, and infrared images in the N image pairs are respectively from the N infrared images of the user, and input the N image pairs into the neural network with the encoder-decoder architecture for calculation, to obtain the 3D head point cloud information of the user.

In a feasible embodiment, the preset presentation angle is obtained based on the N infrared images of the user.

In a feasible embodiment, the server is further configured to obtain the 3D head image of the user based on a color depth image.

In an aspect of obtaining the 3D head image of the user based on a color depth image, the server is further configured to obtain 3D head point cloud information of the user and a face texture feature of the user based on the color depth image, and construct the 3D head image of the user based on the 3D head point cloud information of the user and the face texture feature of the user, where the 3D head image of the user is a color image.

Further, the preset presentation angle is obtained based on the color depth image.

These aspects or other aspects of the present application are clearer and more comprehensible in descriptions of the following embodiments.

BRIEF DESCRIPTION OF DRAWINGS

To describe the technical solutions in some of the embodiments of the present application more clearly, the following briefly describes the accompanying drawings describing some of the embodiments. It is clear that the accompanying drawings in the following descriptions show merely some embodiments of the present application, and a person of ordinary skill in the art may derive other drawings from these accompanying drawings without creative efforts.

DESCRIPTION OF EMBODIMENTS

The following describes the embodiments of this application with reference to accompanying drawings.

Figure 1:
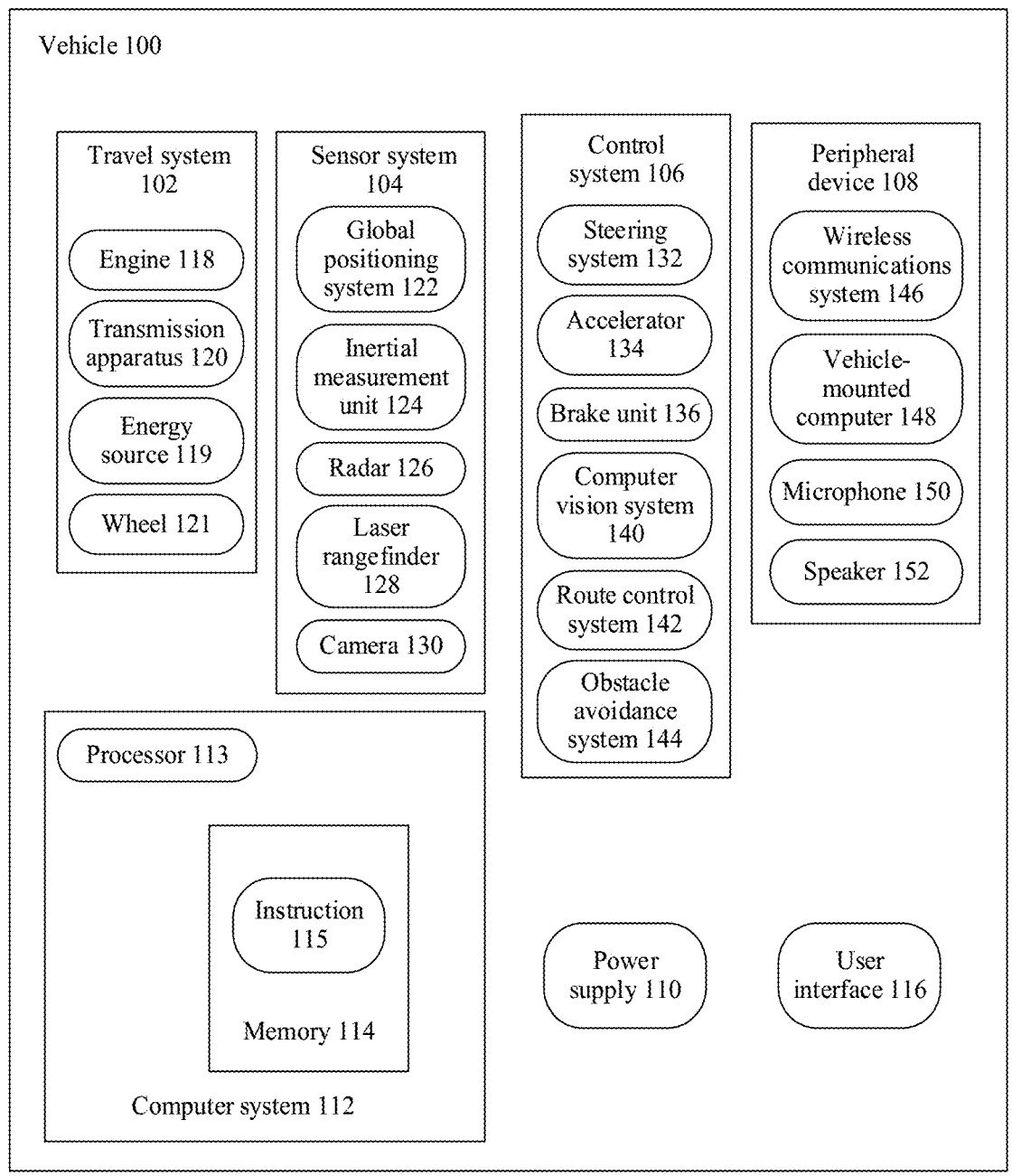
FIG. 1 is a schematic diagram of a structure of an autonomous driving vehicle according to an embodiment of the present application.

FIG. 1 is a functional block diagram of a vehicle 100 according to an embodiment of the present application. In an embodiment, the vehicle 100 is configured to be in a fully or partially autonomous driving mode. For example, when the vehicle 100 is in the autonomous driving mode, the vehicle 100 may control the vehicle 100, and may determine current statuses of the vehicle and an ambient environment of the vehicle based on human operations, determine possible behavior of at least one another vehicle in the ambient environment, determine a confidence level corresponding to a possibility that the another vehicle performs the possible behavior, and control the vehicle 100 based on the determined information. When the vehicle 100 is in the autonomous driving mode, the vehicle 100 may be set to operate without interaction with a person.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include fewer or more subsystems, and each subsystem may include a plurality of elements. In addition, all the subsystems and elements of the vehicle 100 may be wiredly or wirelessly interconnected to each other.

The travel system 102 may include a component that provides power for the vehicle 100 to move. In an embodiment, the travel system 102 may include an engine 118, an energy source 119, a transmission apparatus 120, and a wheel/tire 121. The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, and other power sources. The energy source 119 may also provide energy for another system of the vehicle 100.

The transmission apparatus 120 may transmit mechanical power from the engine 118 to the wheel 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that sense information about the ambient environment of the vehicle 100. For example, the sensor system 104 may include a positioning system 122 (where the positioning system may be a Global Positioning System (GPS), a BEIDOU system, or another positioning system), an inertial measurement unit (IMU) 124, a radar 126, a laser rangefinder 128, and a camera 130. The sensor system 104 may further include sensors (for example, an in-vehicle air quality monitor, a fuel gauge, and an oil temperature gauge) in an internal system of the monitored vehicle 100. Sensor data from one or more of these sensors can be used to detect an object and corresponding features (a location, a shape, a direction, a speed, and the like) of the object. Such detection and identification are key functions of a safety operation of the autonomous vehicle 100.

The positioning system 122 may be configured to estimate a geographical location of the vehicle 100. The IMU 124 is configured to sense location and orientation changes of the vehicle 100 based on inertial acceleration. In an embodiment, the IMU 124 may be a combination of an accelerometer and a gyroscope.

The radar 126 may sense an object in the ambient environment of the vehicle 100 by using a radio signal. In some embodiments, in addition to sensing the object, the radar 126 may be further configured to sense a speed and/or a moving direction of the object.

The laser rangefinder 128 may sense, by using a laser, an object in an environment in which the vehicle 100 is located. In some embodiments, the laser rangefinder 128 may include one or more laser sources, a laser scanner, one or more detectors, and another system component.

The camera 130 may be configured to capture a plurality of images of the ambient environment of the vehicle 100. The camera 130 may be a static camera or a video camera.

The control system 106 controls operations of the vehicle 100 and the components of the vehicle 100. The control system 106 may include various elements, including a steering system 132, a throttle 134, a brake unit 136, a sensor fusion algorithm 138, a computer vision system 140, a route control system 142, and an obstacle avoidance system 144.

The steering system 132 may operate to adjust a moving direction of the vehicle 100. For example, in an embodiment, the steering system 132 may be a steering wheel system.

The throttle 134 is configured to control an operating speed of the engine 118 and further control a speed of the vehicle 100.

The brake unit 136 is configured to control the vehicle 100 to decelerate. The brake unit 136 may use friction to reduce a rotational speed of the wheel 121. In another embodiment, the brake unit 136 may convert kinetic energy of the wheel 121 into a current. The brake unit 136 may alternatively reduce a rotational speed of the wheel 121 by using other methods, to control the speed of the vehicle 100.

The computer vision system 140 may operate to process and analyze images captured by the camera 130 to identify objects and/or features in the ambient environment of the vehicle 100. The objects and/or features may include traffic signals, road boundaries, and obstacles. The computer vision system 140 may use an object recognition algorithm, a structure from motion (SFM) algorithm, video tracking, and other computer vision technologies. In some embodiments, the computer vision system 140 may be configured to draw a map for an environment, track an object, estimate a speed of the object, and the like.

The route control system 142 is configured to determine a travel route of the vehicle 100. In some embodiments, the route control system 142 may determine the travel route for the vehicle 100 with reference to data from the sensor 138, the GPS 122, and one or more predetermined maps.

The obstacle avoidance system 144 is configured to identify, evaluate, and avoid or otherwise bypass a potential obstacle in the environment of the vehicle 100.

Certainly, for example, the control system 106 may add or alternatively include components other than those shown and described. Alternatively, the control system 106 may not include some of the foregoing components.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information for the user of the vehicle 100. The user interface 116 may further operate the vehicle-mounted computer 148 to receive user input. The vehicle-mounted computer 148 may perform operations through a touchscreen. In another case, the peripheral device 108 may provide a means for the vehicle 100 to communicate with another device located in the vehicle. For example, the microphone 150 may receive audio (for example, a voice command or other audio input) from the user of the vehicle 100. Similarly, the speaker 152 may output audio to the user of the vehicle 100.

The wireless communications system 146 may wirelessly communicate with one or more devices directly or through a communications network. For example, the wireless communications system 146 may perform communication through a third generation (3G) cellular network such as code-division multiple access (CDMA), Evolution-Data Optimized (EVDO), or Global System for Mobile Communications (GSM)/General Packet Radio Service (GPRS), perform communication through a fourth generation (4G) cellular network such as Long-Term Evolution (LTE), or perform communication through a fifth generation (5G) cellular network. The wireless communications system 146 may communicate with a wireless local area network (WLAN) through WI-FI. In some embodiments, the wireless communications system 146 may directly communicate with a device through an infrared link, BLUETOOTH, or ZIGBEE. Other wireless protocols, for example, various vehicle communications systems, such as the wireless communications system 146, may include one or more dedicated short range communications (DSRC) devices, and these devices may include public and/or private data communication between vehicles and/or roadside stations.

The power supply 110 may supply power to various components of the vehicle 100. In an embodiment, the power supply 110 may be a rechargeable lithium-ion or lead-acid battery. One or more battery packs of such a battery may be configured as the power supply to supply power to the components of the vehicle 100. In some embodiments, the power supply 110 and the energy source 119 may be implemented together, for example, in some pure electric vehicles.

Some or all functions of the vehicle 100 are controlled by the computer system 112. The computer system 112 may include at least one processor 113. The processor 113 executes an instruction 115 stored in a non-transient computer-readable medium such as a data storage apparatus 114. The computer system 112 may alternatively be a plurality of computing devices that control an individual component or a subsystem of the vehicle 100 in a distributed manner.

The processor 113 may be any conventional processor, such as a commercially available central processing unit (CPU). Alternatively, the processor may be a dedicated device such as an application-specific integrated circuit (ASIC) or another hardware-based processor. Although FIG. 1 functionally illustrates the processor, the memory, and other elements of the computer system 112 in a same block, a person of ordinary skill in the art should understand that the processor, the computer, or the memory may actually include a plurality of processors, computers, or memories that may or may not be stored in a same physical housing. For example, the memory may be a hard disk drive, or another storage medium located in a housing different from that of the computer 110. Therefore, a reference to the processor or the computer is understood as including a reference to a set of processors, computers, or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In other aspects, some of the processes described herein are performed on the processor disposed inside the vehicle, while others are performed by a remote processor. The processes include necessary steps for performing a single operation.

In some embodiments, the data storage apparatus 114 may include the instruction 115 (for example, program logic), and the instruction 115 may be executed by the processor 113 to perform various functions of the vehicle 100, including the functions described above. The data storage apparatus 114 may further include additional instructions, including instructions for sending data to, receiving data from, interacting with, and/or controlling one or more of the travel system 102, the sensor system 104, the control system 106, and the peripheral device 108.

In addition to the instruction 115, the data storage apparatus 114 may further store data, such as a road map, route information, a location, a direction, a speed, and other vehicle data of the vehicle, and other information. Such information may be used by the vehicle 100 and the computer system 112 when the vehicle 100 operates in an autonomous mode, a semi-autonomous mode, and/or a manual mode.

The camera 130 obtains a face image of the user in a video call process, and the processor 113 in the computer system 112 executes the instruction 115 stored in the memory 114, to perform the following steps of obtaining a key feature point of a facial expression of the user based on the face image of the user in the video call process, driving a 3D head image of the user by using the key feature point of the facial expression of the user, to obtain a target 3D avatar of the user, where the target 3D avatar of the user has an expression of the user, rotating the target 3D avatar based on a preset target presentation angle, to obtain a target 3D avatar at the preset presentation angle, and sending the target 3D avatar at the preset presentation angle to a peer video call device.

The user interface 116 is configured to provide information for or receive information from the user of the vehicle 100. Optionally, the user interface 116 may include one or more input/output devices within a set of peripheral devices 108, such as the wireless communications system 146, the vehicle-mounted computer 148, the microphone 150, and the speaker 152.

The computer system 112 may control functions of the vehicle 100 based on input received from various subsystems (for example, the travel system 102, the sensor system 104, and the control system 106) and from the user interface 116. For example, the computer system 112 may use input from the control system 106 to control the steering unit 132 to avoid an obstacle detected by the sensor system 104 and the obstacle avoidance system 144. In some embodiments, the computer system 112 may operate to provide control on the vehicle 100 and the subsystems of the vehicle 100 in many aspects.

Optionally, one or more of the foregoing components may be installed separately from or associated with the vehicle 100. For example, the data storage apparatus 114 may be partially or completely separated from the vehicle 100. The foregoing components may be communicatively coupled together in a wired and/or wireless manner.

Optionally, the components are merely examples. In actual application, components in the foregoing modules may be added or deleted based on an actual requirement. FIG. 1 should not be construed as a limitation on the embodiments of the present application.

An autonomous vehicle traveling on a road, such as the vehicle 100, may identify objects in the ambient environment of the vehicle 100 to determine to adjust a current speed. The objects may be the other vehicles, traffic control devices, or objects of other types. In some examples, the autonomous vehicle may independently consider each identified object, and may determine a to-be-adjusted speed of the autonomous vehicle based on characteristics of each identified object, such as a current speed of the object, acceleration of the object, and a distance between the object and the vehicle.

Optionally, the autonomous vehicle 100 or a computing device (such as the computer system 112, the computer vision system 140, and the data storage apparatus 114 in FIG. 1) associated with the autonomous vehicle 100 may predict behavior of the identified object based on the characteristic of the identified object and a status (for example, traffic, rain, or ice on a road) of the ambient environment. Optionally, all the identified objects depend on behavior of each other, and therefore all the identified objects may be considered together to predict behavior of a single identified object. The vehicle 100 can adjust the speed of the vehicle 100 based on the predicted behavior of the identified object. In other words, the autonomous vehicle can determine, based on the predicted behavior of the object, a specific stable state (for example, acceleration, deceleration, or stop) to which the vehicle needs to be adjusted. In this process, another factor may also be considered to determine the speed of the vehicle 100, for example, a horizontal location of the vehicle 100 on a road on which the vehicle travels, a curvature of the road, and proximity between a static object and a dynamic object.

In addition to providing an instruction for adjusting the speed of the autonomous vehicle, the computing device may further provide an instruction for modifying a steering angle of the vehicle 100, so that the autonomous vehicle can follow a given track and/or maintain safe horizontal and vertical distances from an object (for example, a car in a neighboring lane on the road) near the autonomous vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in the embodiments of the present application.

It should be understood that the user in this application may be considered as a driver.

Figures 2A, 2B:
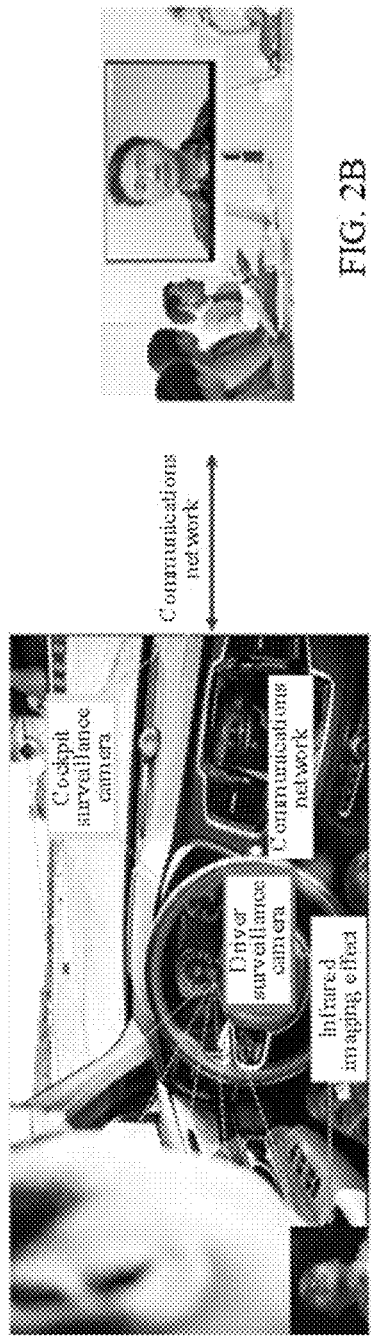
FIG. 2A and FIG. 2B are a schematic diagram of a video call scenario according to an embodiment of the present application.

FIG. 2A and FIG. 2B are a schematic diagram of a video call scenario according to an embodiment of the present application. As shown in FIG. 2A and FIG. 2B, during driving, a driver needs to make a video call or a video conference. An image of the driver in a video call process or a video conference process is obtained by using a camera, a key feature point of a facial expression of the driver is obtained based on the face image, a 3D head avatar of the driver is driven by using the key feature point of the facial expression of the user, to obtain a target 3D avatar of the driver, where the target 3D avatar of the driver has an expression of the driver, the target 3D avatar of the driver is rotated based on a preset target presentation angle, to obtain a target 3D avatar at the preset presentation angle, where the 3D head avatar of the driver is constructed based on the face image of the driver, and the target 3D avatar at the preset presentation angle is sent to a peer video call device through a communications network, as shown in FIG. 2B.

In an example, the face image of the driver includes N infrared face images of the driver. Optionally, the N infrared face images of the driver may be multi-angle head images of the driver. Optionally, the 3D head avatar of the driver is constructed based on the N infrared face images of the driver.

Optionally, the face image of the driver includes the N infrared face images of the driver and a color face image of the driver. A color 3D head avatar of the driver is constructed based on the N infrared face images of the driver and the color face image of the driver. The 3D head avatar of the driver is driven by using the key point of the facial expression of the driver, to obtain the target 3D avatar of the driver, where the target 3D avatar of the driver is a color avatar.

Optionally, the 3D head avatar of the driver is obtained from a third-party server.

Optionally, the preset presentation angle is obtained based on the N infrared face images of the driver.

As shown in FIG. 2A, the color face image of the driver is obtained by a cockpit surveillance camera, and the N infrared face images of the driver are obtained by a driver surveillance camera.

It should be noted that the cockpit surveillance camera is a color camera and the driver surveillance camera is an infrared camera.

In an example, the face image of the driver is a color depth image, the camera is a depth camera, and the depth camera may be a time-of-flight (TOF) camera, a binocular camera, or another depth camera. The 3D head avatar of the driver is obtained based on the color depth image. Optionally, the preset presentation angle is obtained based on the depth camera.

It should be noted herein that, for a specific process of implementing the scenario shown in FIG. 2A and FIG. 2B, refer to related descriptions in the following embodiments.

Figure 3:
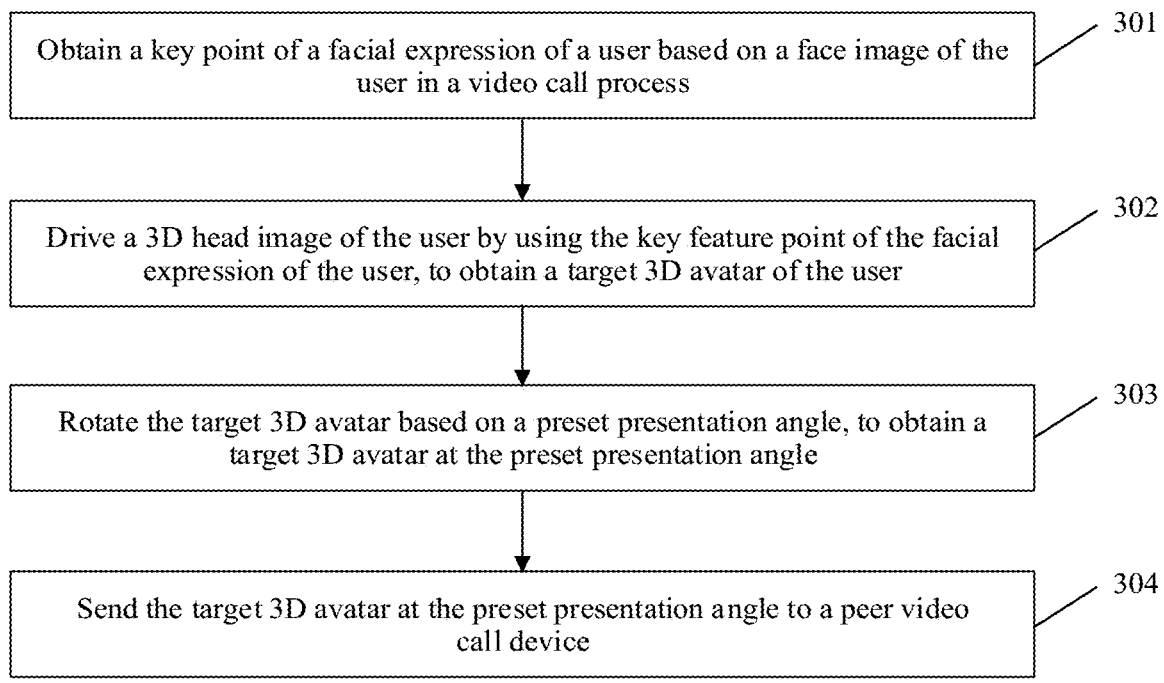
FIG. 3 is a schematic flowchart of a method for presenting a face in a video call according to an embodiment of the present application.

FIG. 3 is a schematic flowchart of a method for presenting a face in a video call according to an embodiment of the present application. As shown in FIG. 3, the method includes the following steps.

S301: Obtain a key point of a facial expression of a user based on a face image of the user in a video call process.

Optionally, the face image of the user in the video call process includes an infrared image of the user, and the key feature point of the facial expression of the user is obtained based on the infrared image of the user.

S302: Drive a 3D head image of the user by using the key feature point of the facial expression of the user, to obtain a target 3D avatar of the user.

The target 3D avatar of the user has an expression of the user.

In a feasible embodiment, the method in the present application further includes constructing the 3D head image of the user based on the face image of the user.

Further, the face image of the user includes N infrared images of the user, and N is an integer greater than 0, and constructing the 3D head image of the user based on the face image of the user includes obtaining first 3D head point cloud information of the user based on the N infrared images of the user, and constructing the 3D head image of the user based on the first 3D head point cloud information of the user.

In a feasible embodiment, the face image of the user includes N infrared images of the user and a color face image of the user, and N is an integer greater than 0, and constructing the 3D head image of the user based on the face image of the user includes obtaining second 3D head point cloud information of the user based on the N infrared images of the user and the color face image of the user, and constructing the 3D head image of the user based on the second 3D head point cloud information of the user.

In a feasible embodiment, the face image of the user further includes the color face image of the user, and the method in the present application further includes obtaining a face texture feature of the user based on the color face image of the user, and constructing the 3D head image of the user based on the 3D head point cloud information of the user includes constructing the 3D head image of the user based on the 3D head point cloud information of the user and the face texture feature of the user, where the 3D head image of the user is a color image, and the 3D head point cloud information of the user includes the first 3D head point cloud information of the user or the second 3D head point cloud information of the user.

Further, obtaining a face texture feature of the user based on the color face image of the user includes inputting the color face image of the user into a texture feature extraction network for calculation, to obtain the face texture feature of the user.

In a feasible embodiment, the face image of the user includes N infrared images of the user and a color face image of the user, and constructing the 3D head image of the user based on the face image of the user includes inputting the color face image of the user and the N infrared images of the user into a feature extraction model for calculation, to obtain 3D head point cloud information of the user and a face texture feature of the user, and constructing the 3D head image of the user based on the 3D head point cloud information of the user and the face texture feature of the user, where the 3D head image of the user is a color image.

In a feasible embodiment, the feature extraction model includes a 3D head feature extraction network and a texture feature extraction network, and inputting the color face image of the user and the N infrared images of the user into a feature extraction model for calculation, to obtain 3D head point cloud information of the user and a face texture feature of the user includes inputting the color face image of the user and the N infrared images of the user into the 3D head feature extraction network for calculation, to obtain the 3D head point cloud information of the user, and inputting the color face image of the user into the texture feature extraction network for calculation, to obtain the face texture feature of the user.

In a feasible embodiment, the 3D head feature extraction network is a neural network that uses an encoder-decoder architecture, and inputting the color face image of the user and the N infrared images of the user into the 3D head feature extraction network for calculation, to obtain the 3D head point cloud information of the user includes obtaining N image pairs based on the color face image of the user and the N infrared images of the user, where each of the N image pairs includes a color image and an infrared image of the user, the color image in the N image pairs is the color face image of the user, and infrared images in the N image pairs are respectively from the N infrared images of the user, and inputting the N image pairs into the neural network with the encoder-decoder architecture for calculation, to obtain the 3D head point cloud information of the user.

Figure 4:
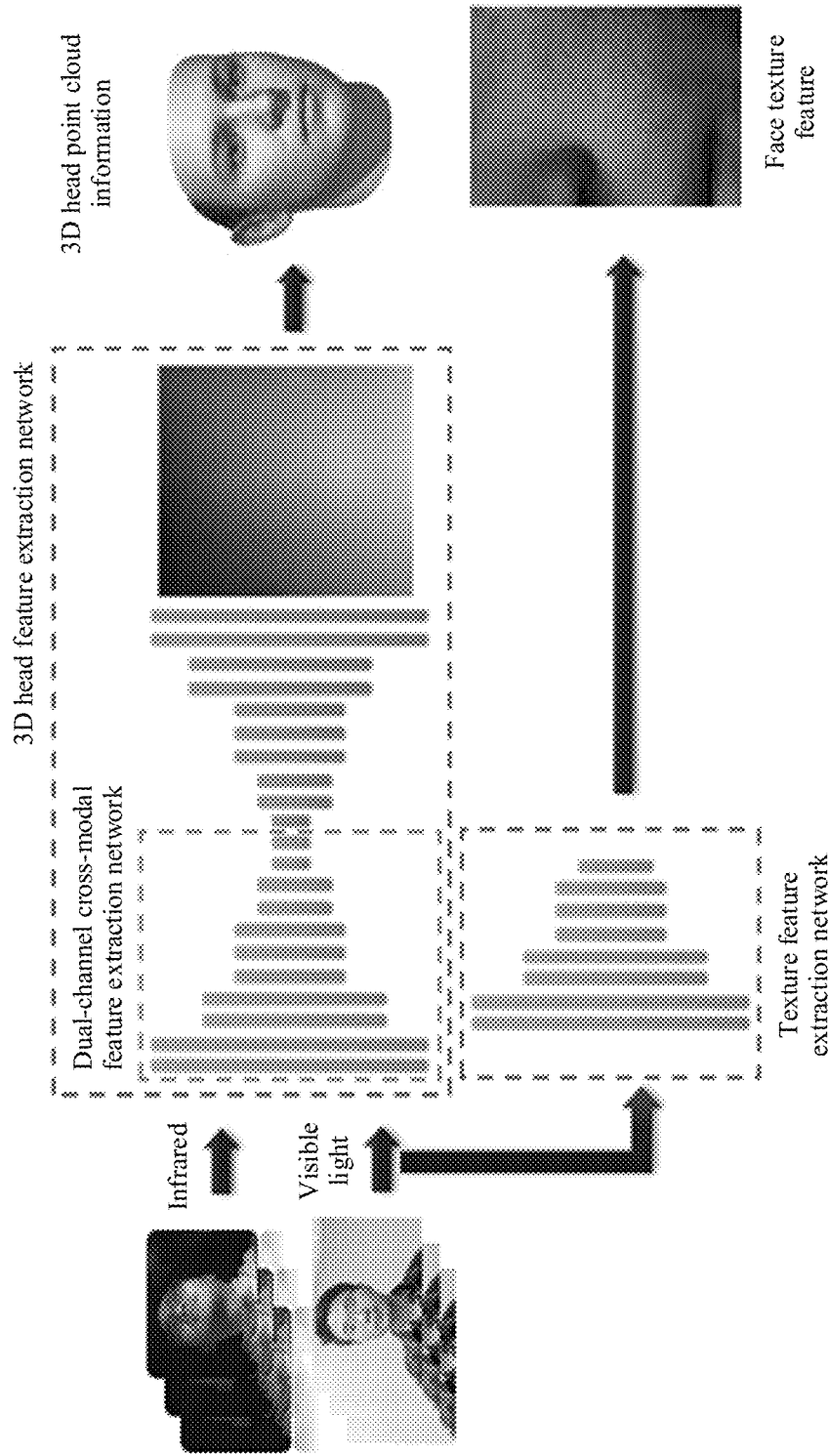
FIG. 4 is a schematic architectural diagram of a 3D head feature extraction network according to an embodiment of the present application.

Further, as shown in FIG. 4, the feature extraction model includes a 3D head feature extraction network and a texture feature extraction network. It should be noted that, in the 3D head feature extraction network, the input "infrared" is represented as an infrared face image of the user, and the input "visible light" is represented as a color face image of the user. The infrared face image of the user and the color face image of the user are input into the 3D head feature extraction network, to output 3D head point cloud information of the user. The color face image of the user is input into the texture feature extraction model, to output a face texture feature of the user.

Figure 5:
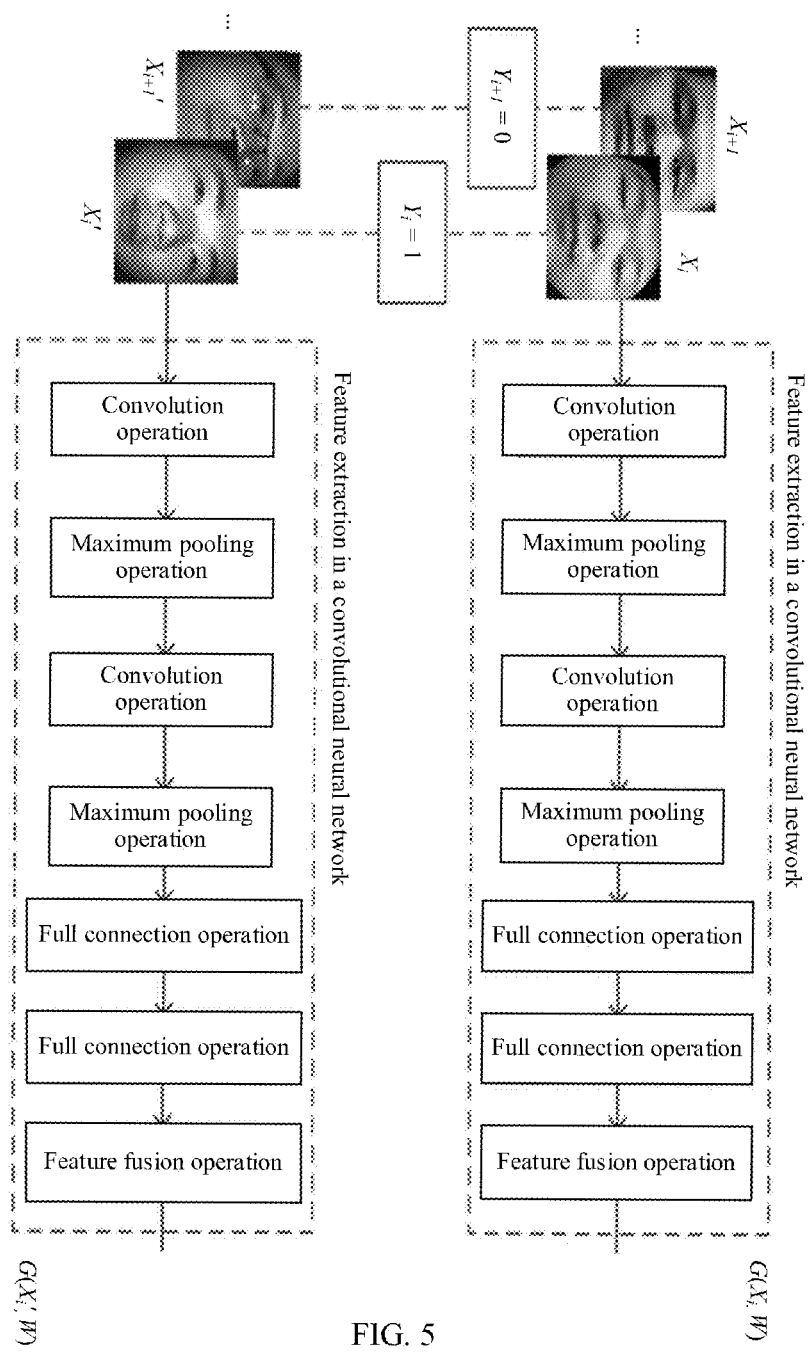
FIG. 5 is a schematic architectural diagram of a dual-channel cross-modal feature extraction network according to an embodiment of the present application.

As shown in FIG. 4, a front-end feature extraction model may also be referred to as a dual-channel cross-modal feature extraction network, and the network is a convolutional neural network (CNN)-based twin neural network. FIG. 5 is a schematic diagram of a structure of a dual-channel cross-modal feature extraction network. The network is a CNN-based twin neural network. Some or all weights in the twin neural network are the same, or two CNNs in the twin neural network share a weight. As shown in FIG. 5, input data in the twin neural network is an image pair, the image pair includes a color face image of a user, an infrared image of the user, and a similarity identifier, and the similarity identifier is used to indicate whether the infrared image of the user and the color face image of the user are the same, or whether the infrared image and the color frontal face image are images of a same user.

The image pair may be represented as (Xi, Xi', Yi), where i indicates that the image pair is an $i^{th}$ image pair in input image pairs, Xi is the color frontal face image, Xi' represents the infrared image, and Yi is the similarity identifier in the image pair. A value of the similarity identifier is used to indicate whether the corresponding color face image Xi of the user and the corresponding infrared image Xi' of the user are the same or are images of a same user. For example, a value 0 or "false" of the similarity identifier indicates that the corresponding color face image Xi of the user and the corresponding infrared image Xi' of the user are different or are images of different users, and a value 1 or "true" of the similarity identifier indicates that the corresponding color face image Xi of the user and the corresponding infrared image Xi' of the user are the same or are the images of the same user.

The color face image of the user and the infrared image of the user that are in the image pair are input into the twin neural network for calculation, so that operations including a convolution operation, a maximum pooling operation, a full connection operation, a feature fusion operation, and the like are implemented, and therefore a feature vector of the user is obtained. Then, the feature vector of the user is input into a back-end feature extraction model for calculation, to obtain 3D head point cloud information of the user.

It should be noted herein that the convolution operation, the maximum pooling operation, and the full connection operation are respectively implemented at a convolutional layer, a pooling layer, and a full connection layer in the twin neural network.

In a feasible embodiment, before the front-end feature extraction model is used, the twin neural network needs to be trained, to obtain the front-end feature extraction model.

Further, a plurality of image pairs are obtained, and then a color face image of the user and an infrared image of the user that are in each of the plurality of image pairs are input into a twin neural network model for calculation, to obtain a feature vector. Then, a loss value is calculated based on the feature vector and a loss function. Finally, a weight in the twin neural network model is adjusted based on the loss value.

The twin neural network model is repeatedly trained according to the foregoing method until the twin neural network model meets a use requirement.

In the dual-channel cross-modal feature extraction network (that is, the front-end feature extraction model), the used loss function is Contrastive Loss. This loss function can effectively handle a relative relationship between images in the network. An expression of Contrastive Loss is as follows:

$$L = \frac{1}{2N}\sum_{n=1}^{N} yd^2 + (1-y)\max(\text{margin} - d, 0)^2.$$

Herein, $d = \|a_n - b_n\|_2$, and d represents a Euclidean distance between features of two samples (that is, the color face image of the user and the infrared image of the user), y is a label indicating whether the two samples match, y of 1 indicates that the two samples are similar or match, and y of 0 indicates that the two samples do not match, and the margin is a specified threshold. In addition, this loss function can effectively alleviate relative dependence of the training network on the images.

A back-end decoder (that is, the back-end feature extraction model) uses a transposed convolutional layer, and the loss function is represented by 2-norms between coordinates of each pixel and corresponding real values. The back-end feature extraction model receives a feature vector extracted by the dual-channel cross-modal feature extraction network and uses the feature vector as input, and outputs 3D point cloud coordinates (65,536), that is, the 3D head point cloud information of the user.

The dual-channel cross-modal feature extraction network is diversified in a specific network implementation form. Some hidden layers may be shared in two parallel convolutional neural networks, to implement parameter sharing and cross-modal information fusion, or both the infrared image and the color image may be input into a single convolutional network, to implement cross-modal information extraction and fusion, or parameters of two completely parallel and independent convolutional neural networks are enabled to be as similar as possible by using a regularization method, to implement information fusion.

The texture feature extraction model is a common convolutional neural network, for example, ResNet or MobileNet. A middle layer of the dual-channel cross-modal feature extraction network is used as output, to extract a face texture feature.

In a feasible embodiment, in a video call process, a plurality of infrared images of the user are obtained in real time, 3D head point cloud information of the user is obtained based on the plurality of infrared images of the user, and then the 3D head image of the user is constructed based on the 3D head point cloud information of the user and the previously obtained 3D head point cloud information of the user. According to the solution in this embodiment, the 3D head image of the user is constructed by continuously obtaining the infrared images of the user, to optimize the 3D head image of the user, so as to improve user experience in a video call.

In another feasible embodiment, the method in the present application further includes obtaining the 3D head image of the user based on a color depth image, and obtaining the 3D head image of the user based on a color depth image includes obtaining 3D head point cloud information of the user and a face texture feature of the user based on the color depth image, and constructing the 3D head image of the user based on the 3D head point cloud information of the user and the face texture feature of the user, where the 3D head image of the user is a color image.

In another feasible embodiment, the 3D head image of the user is obtained from a third-party server.

S303: Rotate the target 3D avatar based on a preset presentation angle, to obtain a target 3D avatar at the preset presentation angle.

The target 3D avatar at the preset presentation angle may be an avatar of presenting a frontal face of the user, an avatar of presenting a side face of the user, or an avatar that is of the user and that is at another angle.

In a feasible embodiment, the preset presentation angle is obtained based on the N infrared images of the user.

In a feasible embodiment, the preset presentation angle is obtained based on the color depth image.

Further, an angle V at which the target 3D avatar needs to be rotated from a current head presentation angle of the user to the preset presentation angle is determined based on the N infrared images of the user or the color depth images, and the target 3D avatar is rotated by the angle V, so that a presentation angle of the target 3D avatar is the preset presentation angle.

In another specific embodiment, a face image of a user in an in-vehicle video call process is obtained, where the face image includes a color face image of the user and a plurality of infrared images of the user, a 3D head image of the user is constructed based on the color face image of the user and the plurality of infrared images of the user, a key feature point of a facial expression of the user is obtained based on the plurality of infrared images of the user, the 3D head image of the user is driven based on the key feature point of the facial expression of the user, to obtain a target 3D avatar, and the target 3D avatar is rotated based on a preset presentation angle, to obtain a target 3D avatar at the preset presentation angle.

The preset presentation angle may be preset, or may be obtained based on the plurality of infrared images of the user.

Optionally, the color face image of the user is a color frontal face image of the user.

S304: Send the target 3D avatar at the preset presentation angle to a peer video call device.

It can be learned that, in the solution of this embodiment of the present application, the key feature point of the facial expression of the user is obtained based on the face image of the user in the video call process, the 3D head image of the user is driven by using the key feature point of the facial expression of the user, to obtain the target 3D avatar of the user, where the target 3D avatar of the user has the expression of the user, the target 3D avatar is rotated based on the preset target presentation angle, to obtain the target 3D avatar at the preset presentation angle, and the target 3D avatar at the preset presentation angle is sent to the peer video call device. During a video call, the 3D head avatar of the user is driven based on the key feature point that is of the facial expression of the user and that is obtained based on the face image of the user in the video call process, so that a video peer user can see an expression of the user in real time, and the 3D avatar that is of the user and that is at the preset presentation angle is obtained, and the obtained 3D avatar at the preset presentation angle is sent to the peer video call device, so that a peer user can see the head image that is of the user and that is at the preset angle, to improve the video call experience.

Figure 6:
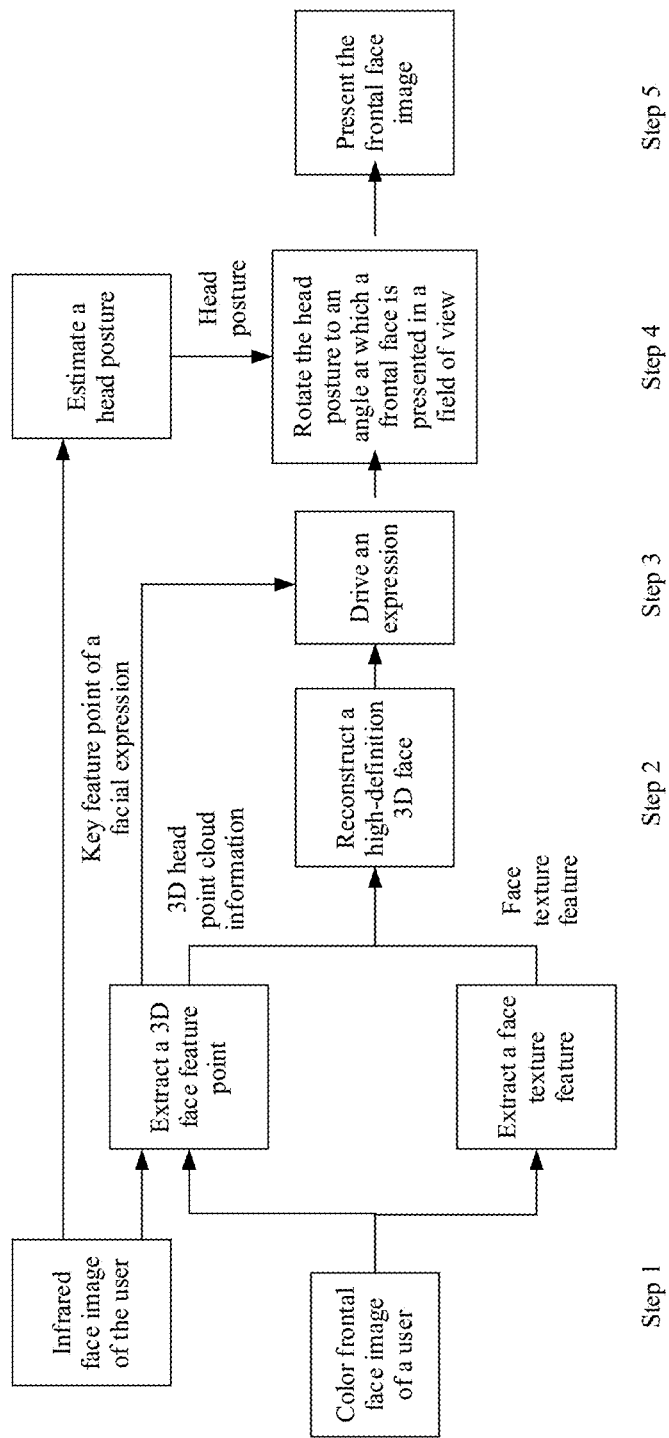
FIG. 6 is a schematic flowchart of another method for presenting a face in a video call according to an embodiment of the present application.

FIG. 6 is a schematic flowchart of another method for presenting a face in a video call according to an embodiment of the present application. As shown in FIG. 6, the method includes the following steps.

Step 1: Obtain a color frontal face image of a user and a plurality of consecutive infrared images of the user, extract a 3D face feature based on the color frontal face image of the user and the plurality of consecutive infrared images of the user, to obtain 3D head point cloud information of the user, extract a face texture feature based on the color frontal face image of the user, to obtain the face texture feature of the user, and extract a 3D face feature based on the plurality of infrared images of the user, to obtain a key feature point of a facial expression.

Step 2: Construct a 3D face based on the 3D head point cloud information of the user and the face texture feature of the user, to obtain a color 3D head image of the user.

Step 3: Drive the color 3D head image of the user based on the key feature point of the facial expression, to obtain a target 3D avatar, where the target 3D avatar of the user has a real-time expression of the user.

Step 4: Estimate a head posture based on the plurality of infrared images of the user to obtain the head posture, determine a rotation angle based on the head posture, and then rotate the target 3D avatar based on the rotation angle to obtain a rotated target 3D avatar, where the rotated target 3D avatar is a frontal face avatar of the user.

Step 5: Display the rotated target 3D avatar.

Finally, the rotated target 3D avatar is sent to a peer video call device.

Figure 7:
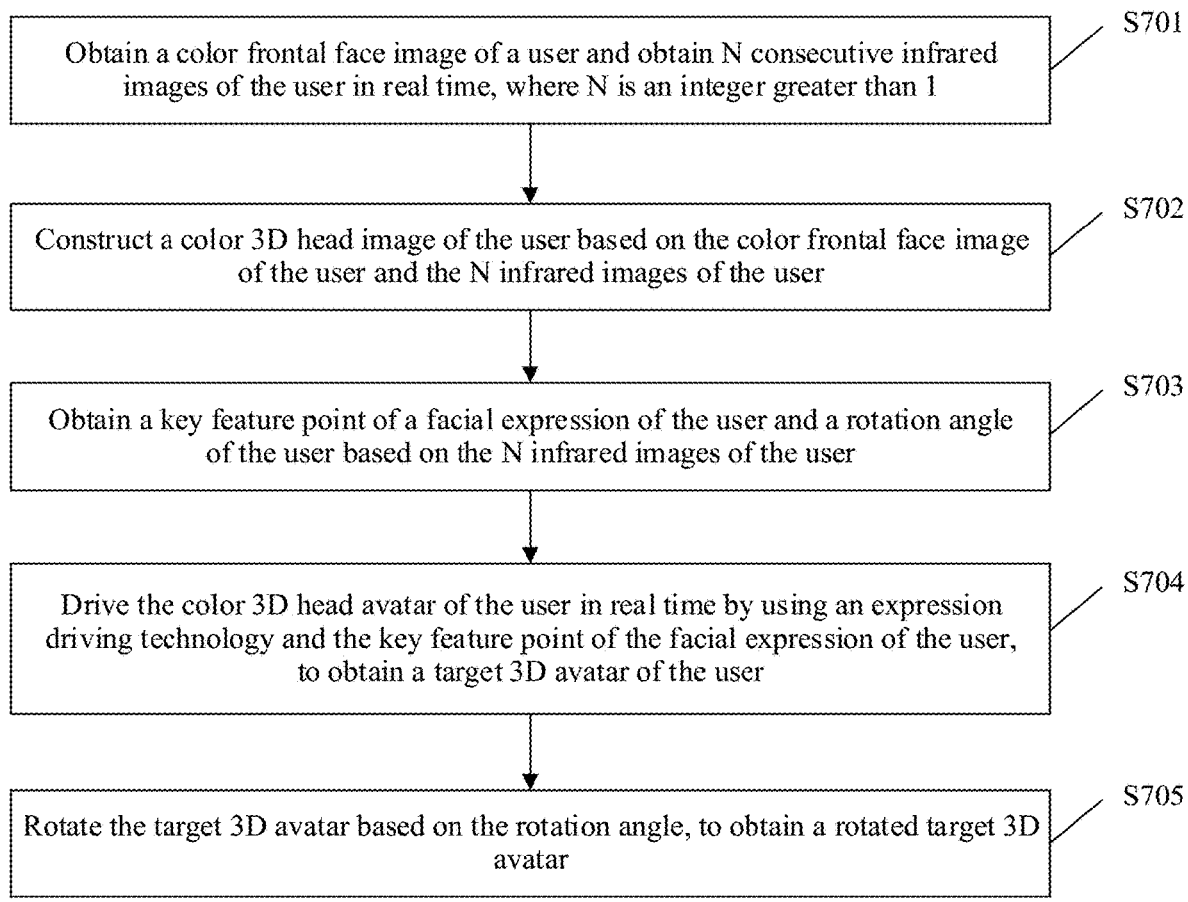
FIG. 7 is a schematic flowchart of another method for presenting a face in a video call according to an embodiment of the present application.

For a specific process of implementing the embodiment shown in FIG. 6, refer to related descriptions in an embodiment shown in FIG. 7.

FIG. 7 is a schematic flowchart of another method for presenting a face in a video call according to an embodiment of the present application. As shown in FIG. 7, the method includes the following steps.

S701: Obtain a color frontal face image of a user and obtain N consecutive infrared images of the user in real time, where N is an integer greater than 1.

The color frontal face image of the user is collected by a cockpit surveillance camera, and the N consecutive infrared images of the user are obtained by a driver surveillance camera. The cockpit surveillance camera is a high-definition color camera, and the driver surveillance camera is an infrared camera.

In an example, that the N consecutive infrared images of the user are obtained by a driver surveillance camera further includes the following. The N consecutive infrared images of the user are directly collected by the driver surveillance camera, or the N consecutive infrared images of the user are obtained from an infrared video of the user, where the infrared video of the user is collected by the driver surveillance camera.

Figure 8:
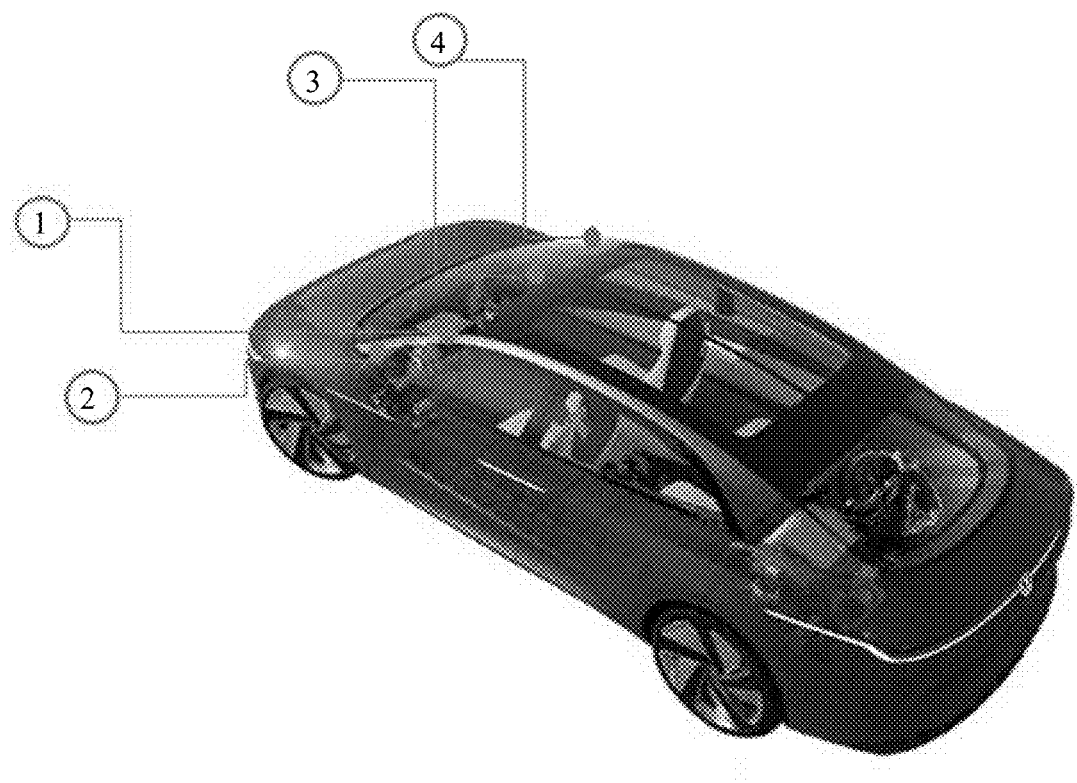
FIG. 8 is a schematic diagram of installation locations of cameras in a vehicle.

Installation locations of the cockpit surveillance camera and the driver surveillance camera on a vehicle are shown in FIG. 8. Driver surveillance cameras are installed at locations ①, ②, and ④ shown in FIG. 8, where the location ① is below a steering wheel and above a dashboard, and the locations ②and ④are left and right A-pillars of a cockpit. An installation principle of the driver surveillance camera is to capture all information about a head and a face of a driver.

The cockpit surveillance camera is installed at a location ③in FIG. 8, and the location ③is above a rearview mirror of the cockpit. An installation principle of the cockpit surveillance camera is to capture an entire cockpit environment.

S702: Construct a color 3D head image of the user based on the color frontal face image of the user and the N infrared images of the user.

Further, the color frontal face image of the user and the N infrared images of the user are input into a feature extraction model for calculation, to obtain 3D head point cloud information of the user and a face texture feature of the user, and the color 3D head avatar of the user is constructed based on the 3D head point cloud information of the user and the face texture feature of the user.

In a feasible embodiment, the feature extraction model includes a 3D head feature extraction network and a texture feature extraction network, and that the color frontal face image of the user and the N infrared images of the user are input into a feature extraction model for calculation, to obtain 3D head point cloud information of the user and a face texture feature of the user includes inputting the color frontal face image of the user and the N infrared images of the user into the 3D head feature extraction network for calculation, to obtain the 3D head point cloud information of the user, and inputting the color frontal face image of the user into the texture feature extraction network for calculation, to obtain the face texture feature of the user.

In a feasible embodiment, the 3D head feature extraction network is a neural network that uses an encoder-decoder architecture, and inputting the color frontal face image of the user and the N infrared images of the user into the 3D head feature extraction network for calculation, to obtain the 3D head point cloud information of the user includes obtaining N image pairs based on the color frontal face image of the user and the N infrared images of the user, where each of the N image pairs includes a color image and an infrared image of the user, the color image in the N image pairs is the color face image of the user, and infrared images in the N image pairs are respectively from the N infrared images of the user, and inputting the N image pairs into the neural network with the encoder-decoder architecture for calculation, to obtain the 3D head point cloud information of the user.

It should be noted herein that, for specific descriptions of step S702, refer to the related descriptions of step S302. Details are not described herein again.

In a feasible embodiment, before a front-end feature extraction model is used, a twin neural network needs to be trained, to obtain the front-end feature extraction model.

S703: Obtain a key feature point of a facial expression of the user and a rotation angle of the user based on the N infrared images of the user.

That a rotation angle of the user is obtained based on the N infrared images of the user includes estimating a head posture based on the N infrared images of the user, to obtain the head posture of the user, and further determining, based on the head posture of the user, a rotation angle at which the head posture is rotated to an angle at which a frontal face is presented in a field of view.

S704: Drive the color 3D head avatar of the user in real time by using an expression driving technology and the key feature point of the facial expression of the user, to obtain a target 3D avatar of the user.

The target 3D avatar of the user has a real-time expression of the user.

The expression driving technology enables the peer party to see a current expression of the user in real time during a video call, so as to improve video call experience.

It should be noted herein that, driving the color 3D head image of the user by using the expression driving technology and the key feature point of the facial expression of the user is common sense in the art. Details not described herein.

S705: Rotate the target 3D avatar based on the rotation angle, to obtain a rotated target 3D avatar.

After the rotated target 3D avatar is obtained, the rotated target 3D avatar is displayed, where the rotated target 3D avatar may be a frontal face avatar of the user, and the rotated target 3D avatar is transmitted to a peer video call device.

In a feasible embodiment, after the rotated target 3D avatar is obtained, the 3D avatar is sent to a device that makes a video call to the user, so that a frontal face of the user is presented during the video call.

It can be learned that, in the solution of this embodiment of this application, the expression of the driver is captured in real time based on an in-vehicle infrared camera (that is, the driver surveillance camera in the foregoing embodiment), to obtain the infrared image, and the infrared image is migrated to the color image of the user to complete expression driving, so that cross-domain migration between infrared and visible light is implemented. Because this application scenario is insensitive to light, an application scope of this solution is expanded. On the premise of complying with traffic laws, in this solution, real-time frontal face presentation and expression change can be performed in the image of the driver at any angle within a field of view of the cockpit surveillance camera, to ensure driving safety and improve user experience in a video conference. An existing resource in an in-vehicle environment is used, and a wearable device is not required. Therefore, the solution in this application is used more simply and conveniently.

Figure 9:
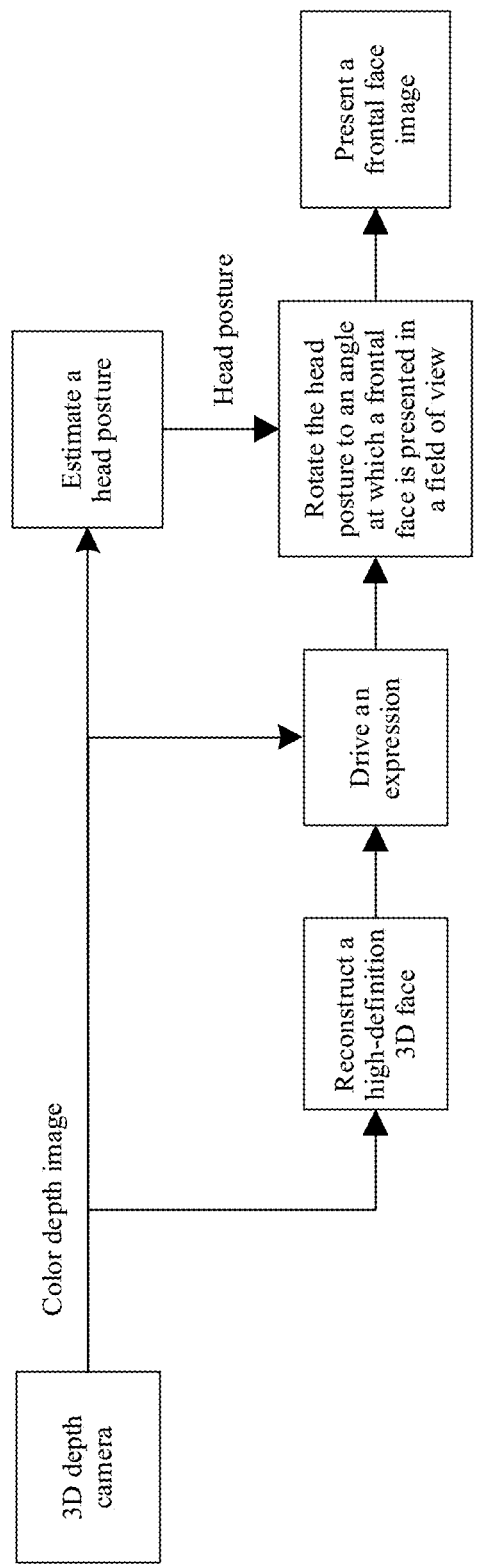
FIG. 9 is a schematic flowchart of another method for presenting a face in a video call according to an embodiment of the present application.

In another specific embodiment, as shown in FIG. 9, a color depth image of a user is obtained by using a depth camera, a color 3D head image of the user is constructed based on the color depth image of the user, a key feature point of a facial expression of the user is obtained based on the color depth image of the user, a color 3D head image of the user is driven based on the key feature point of the facial expression of the user, to obtain a target 3D avatar of the user, where the target 3D avatar of the user has a real-time expression of the user, the target 3D avatar is rotated based on a preset presentation angle, to obtain a target 3D avatar at the preset presentation angle, and the target 3D avatar at the preset presentation angle is sent to a peer video call device.

In a feasible embodiment, that a color 3D head image of the user is constructed based on the color depth image of the user includes obtaining 3D head point cloud information of the user and a face texture feature of the user from the color depth image of the user, and then constructing the color 3D head image of the user based on the 3D head point cloud information of the user and the face texture feature of the user.

It should be noted herein that, for specific related descriptions of the embodiment shown in FIG. 9, refer to the related descriptions of steps S703 to S705. Details are not described herein again.

It should be noted herein that, this embodiment of the present application is not only applicable to an in-vehicle video call or an in-vehicle video conference, but also applicable to virtual social networking, AR wear (shopping), a video call, and holographic interaction. For a specific implementation process, refer to the related descriptions in the embodiments shown in FIG. 3, FIG. 7, and FIG. 8.

Figure 10:
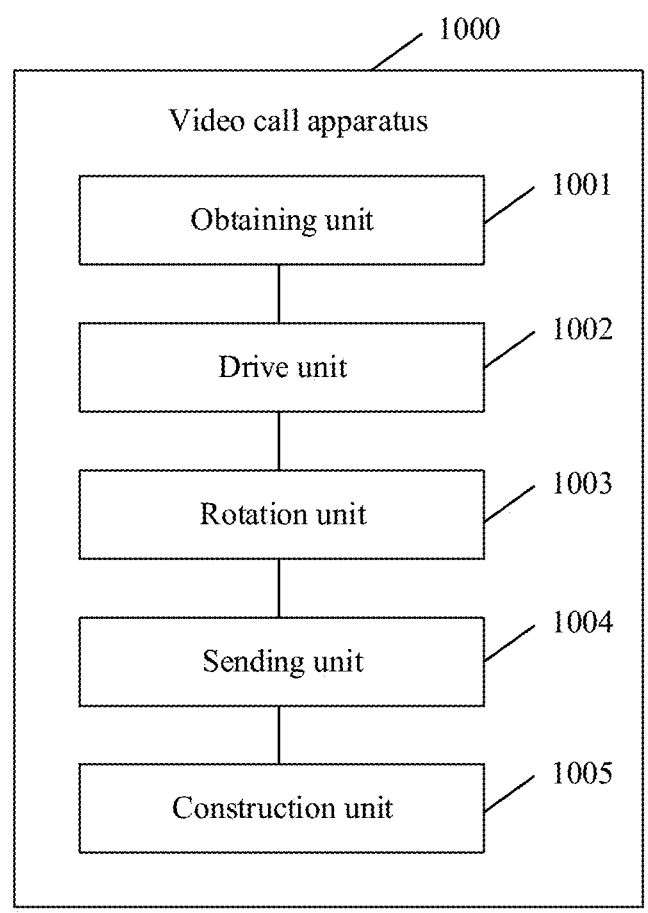
FIG. 10 is a schematic diagram of a structure of a video call apparatus according to an embodiment of the present application.

FIG. 10 is a schematic diagram of a structure of a video call apparatus according to an embodiment of this application. As shown in FIG. 10, the video call apparatus 1000 includes an obtaining unit 1001 configured to obtain a key feature point of a facial expression of a user based on a face image of the user in a video call process, a drive unit 1002 configured to drive a 3D head image of the user by using the key feature point of the facial expression of the user, to obtain a target 3D avatar of the user, where the target 3D avatar of the user has an expression of the user, a rotation unit 1003 configured to rotate the target 3D avatar based on a preset presentation angle, to obtain a target 3D avatar at the preset presentation angle, and a sending unit 1004 configured to send the target 3D avatar at the preset presentation angle to a peer video call device.

In a feasible embodiment, the video call apparatus 1000 further includes a construction unit 1005 configured to construct the 3D head image of the user based on the face image of the user.

In a feasible embodiment, the face image of the user includes N infrared images of the user, and N is an integer greater than 0, and the construction unit 1005 is further configured to obtain first 3D head point cloud information of the user based on the N infrared images of the user, and construct the 3D head image of the user based on the first 3D head point cloud information of the user.

In a feasible embodiment, the face image of the user includes N infrared images of the user and a color face image of the user, and N is an integer greater than 0, and the construction unit 1005 is further configured to obtain second 3D head point cloud information of the user based on the N infrared images of the user and the color face image of the user, and construct the 3D head image of the user based on the second 3D head point cloud information of the user.

In a feasible embodiment, the face image of the user further includes the color face image of the user.

The obtaining unit 1001 is further configured to obtain a face texture feature of the user based on the color face image of the user.

The construction unit 1005 is further configured to construct the 3D head image of the user based on the 3D head point cloud information of the user and the face texture feature of the user, where the 3D head image of the user is a color image, and the 3D head point cloud information of the user includes the first 3D head point cloud information of the user or the second 3D head point cloud information of the user.

In a feasible embodiment, the face image of the user includes N infrared images of the user and a color head image of the user, and the construction unit 1005 is further configured to input the color head image of the user and the N infrared images of the user into a feature extraction model for calculation, to obtain 3D head point cloud information of the user and a face texture feature of the user, and construct the 3D head image of the user based on the 3D head point cloud information of the user and the face texture feature of the user, where the 3D head image of the user is a color image.

In a feasible embodiment, the feature extraction model includes a 3D head feature extraction network and a texture feature extraction network, and in an aspect of inputting the color face image of the user and the N infrared images of the user into a feature extraction model for calculation, to obtain 3D head point cloud information of the user and a face texture feature of the user, the construction unit 1005 is further configured to input the color face image of the user and the N infrared images of the user into the 3D head feature extraction network for calculation, to obtain the 3D head point cloud information of the user, and input the color face image of the user into the texture feature extraction network for calculation, to obtain the face texture feature of the user.

In a feasible embodiment, the 3D head feature extraction network is a neural network that uses an encoder-decoder architecture, and in an aspect of inputting the color head image of the user and the N infrared images of the user into the 3D head feature extraction network for calculation, to obtain the 3D head point cloud information of the user, the construction unit 1005 is further configured to obtain N image pairs based on the color face image of the user and the N infrared images of the user, where each of the N image pairs includes a color image and an infrared image of the user, the color image in the N image pairs is the color face image of the user, and infrared images in the N image pairs are respectively from the N infrared images of the user, and input the N image pairs into the neural network with the encoder-decoder architecture for calculation, to obtain the 3D head point cloud information of the user.

In a feasible embodiment, the preset presentation angle is obtained based on the N infrared images of the user.

In a feasible embodiment, the face image of the user is a color depth image, and the obtaining unit 1001 is further configured to obtain the 3D head image of the user based on the color depth image.

In an aspect of obtaining the 3D head image of the user based on the color depth image, the construction unit 1005 is further configured to obtain 3D head point cloud information of the user and a face texture feature of the user based on the color depth image, and construct the 3D head image of the user based on the 3D head point cloud information of the user and the face texture feature of the user, where the 3D head image of the user is a color image.

In a feasible embodiment, the preset presentation angle is obtained based on the color depth image.

It should be noted that the foregoing units (the obtaining unit 1001, the drive unit 1002, the rotation unit 1003, the sending unit 1004, and the construction unit 1005) are configured to perform the related steps of the foregoing method. For example, the obtaining unit 1001 is configured to perform the related content in step S301, the drive unit 1002 and the construction unit 1005 are configured to perform the related content in step S302, the rotation unit 1003 is configured to perform the related content in step S303, and the sending unit 1004 is configured to perform the related content in step S304.

In this embodiment, the video call apparatus 1000 is presented in a form of a unit. The "unit" herein may be an ASIC, a processor that executes one or more software or firmware programs and a memory, an integrated logic circuit, and/or another component that can provide the foregoing functions. In addition, the obtaining unit 1001, the drive unit 1002, the rotation unit 1003, and the construction unit 1005 may be implemented by using a processor 1301 in a video call apparatus shown in FIG. 13.

Figure 11:
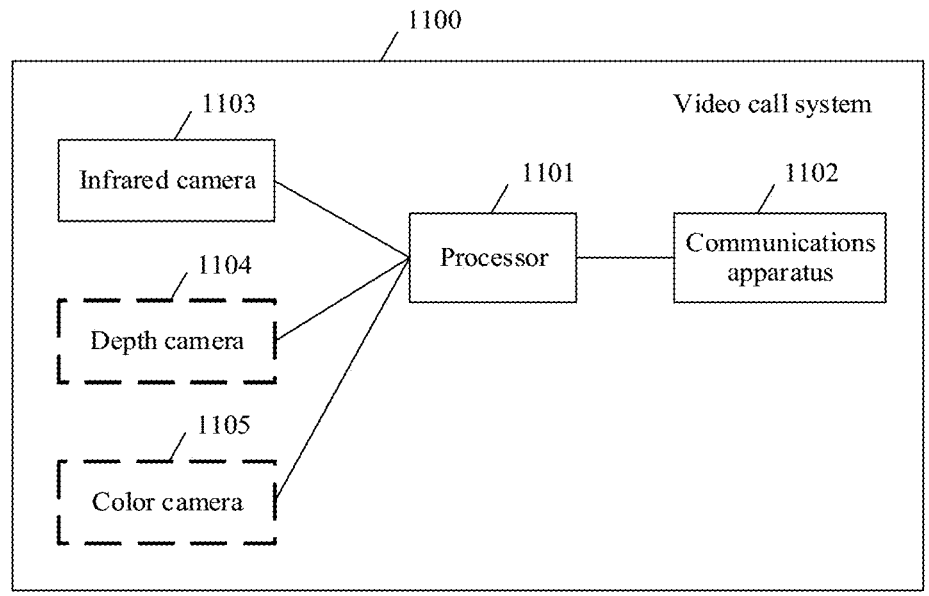
FIG. 11 is a schematic architectural diagram of a video call system according to an embodiment of the present application.

FIG. 11 is a schematic diagram of a structure of a video call system of a vehicle according to an embodiment of the present application. As shown in FIG. 11, the video call system 1100 includes a processor 1101 and a communications apparatus 1102, and the processor 1101 is connected to the communications apparatus 1102.

The processor 1101 is configured to obtain a key feature point of a facial expression of a user based on a face image of the user in a video call process, drive a 3D head image of the user by using the key feature point of the facial expression of the user, to obtain a target 3D avatar of the user, where the target 3D avatar of the user has an expression of the user, rotate the target 3D avatar based on a preset presentation angle, to obtain a target 3D avatar at the preset presentation angle, and transmit the target 3D avatar at the preset presentation angle to the communications apparatus.

The communications apparatus 1102 is configured to send the target 3D avatar at the preset presentation angle to a peer video call device.

In a feasible embodiment, the processor 1101 is further configured to construct the 3D head image of the user based on the face image of the user.

In a feasible embodiment, the face image of the user includes N infrared images of the user, and N is an integer greater than 0, and in an aspect of constructing the 3D head image of the user based on the face image of the user, the processor 1101 is further configured to obtain first 3D head point cloud information of the user based on the N infrared images of the user, and construct the 3D head image of the user based on the first 3D head point cloud information of the user.

In a feasible embodiment, the face image of the user includes N infrared images of the user and a color face image of the user, and N is an integer greater than 0, and in an aspect of constructing the 3D head image of the user based on the face image of the user, the processor 1101 is further configured to obtain second 3D head point cloud information of the user based on the N infrared images of the user and the color face image of the user, and construct the 3D head image of the user based on the second 3D head point cloud information of the user.

In a feasible embodiment, the face image of the user further includes the color face image of the user, and the processor 1101 is further configured to obtain a face texture feature of the user based on the color face image of the user.

In an aspect of constructing the 3D head image of the user based on the face image of the user, the processor 1101 is further configured to construct the 3D head image of the user based on the 3D head point cloud information of the user and the face texture feature of the user, where the 3D head image of the user is a color image, and the 3D head point cloud information of the user includes the first 3D head point cloud information of the user or the second 3D head point cloud information of the user.

In a feasible embodiment, the face image of the user includes N infrared images of the user and a color face image of the user, and in an aspect of constructing the 3D head image of the user based on the face image of the user, the processor 1101 is further configured to input the color face image of the user and the N infrared images of the user into a feature extraction model for calculation, to obtain 3D head point cloud information of the user and a face texture feature of the user, and construct the 3D head image of the user based on the 3D head point cloud information of the user and the face texture feature of the user, where the 3D head image of the user is a color image.

In a feasible embodiment, the feature extraction model includes a 3D head feature extraction network and a texture feature extraction network, and in an aspect of inputting the color face image of the user and the N infrared images of the user into a feature extraction model for calculation, to obtain 3D head point cloud information of the user and a face texture feature of the user, the processor 1101 is further configured to input the color face image of the user and the N infrared images of the user into the 3D head feature extraction network for calculation, to obtain the 3D head point cloud information of the user, and input the color face image of the user into the texture feature extraction network for calculation, to obtain the face texture feature of the user.

In a feasible embodiment, the 3D head feature extraction network is a neural network that uses an encoder-decoder architecture, and in an aspect of inputting the color face image of the user and the N infrared images of the user into the 3D head feature extraction network for calculation, to obtain the 3D head point cloud information of the user, the processor 1101 is further configured to obtain N image pairs based on the color face image of the user and the N infrared images of the user, where each of the N image pairs includes a color image and an infrared image of the user, the color image in the N image pairs is the color face image of the user, and infrared images in the N image pairs are respectively from the N infrared images of the user, and input the N image pairs into the neural network with the encoder-decoder architecture for calculation, to obtain the 3D head point cloud information of the user.

In a feasible embodiment, the video call system further includes a color camera 1105, and the color camera 1105 is connected to the processor 1101.

The color camera 1105 is configured to obtain the color face image of the user, and transmit the color face image of the user to the processor 1101.

In a feasible embodiment, the preset presentation angle is obtained based on the N infrared images of the user.

In a feasible embodiment, the video call system further includes an infrared camera 1103, and the infrared camera 1103 is connected to the processor 1101.

The infrared camera 1103 is configured to obtain the N infrared images of the user, and transmit the N infrared images of the user to the processor 1101.

In a feasible embodiment, the processor 1101 is further configured to obtain the 3D head image of the user based on a color depth image.

In an aspect of obtaining the 3D head image of the user based on a color depth image, the processor 1101 is further configured to obtain 3D head point cloud information of the user and a face texture feature of the user based on the color depth image, and construct the 3D head image of the user based on the 3D head point cloud information of the user and the face texture feature of the user, where the 3D head image of the user is a color image.

In a feasible embodiment, the preset presentation angle is obtained based on the color depth image.

In a feasible embodiment, the video call system further includes a depth camera 1104, and the depth camera 1104 is connected to the processor 1101.

The depth camera 1104 is configured to obtain the color depth image, and transmit the color depth image to the processor.

It should be noted herein that a color frontal face image of the user is built in the processor 1101 or obtained from another device, and does not need to be obtained from the outside by using the color camera 1105. Therefore, the color camera 1105 is represented by using a dashed box.

It should be noted herein that the processor 1101, the communications apparatus 1102, the infrared camera 1103, the depth camera 1104, and the color camera 1105 are configured to perform the related content in the embodiments shown in FIG. 3, FIG. 6, FIG. 7, and FIG. 9.

Figure 12:
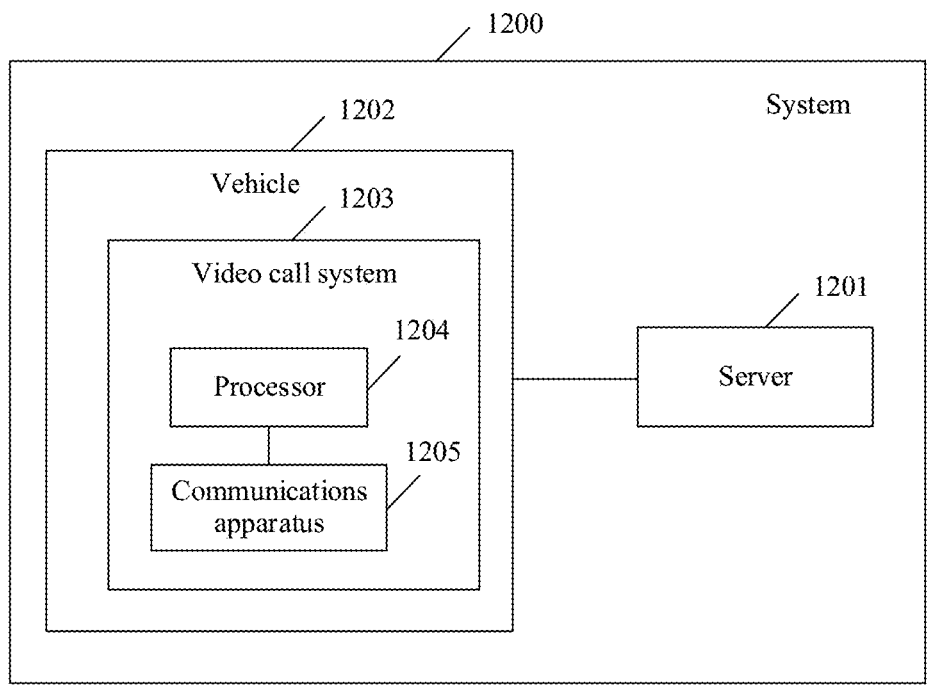
FIG. 12 is a schematic diagram of a structure of a system according to an embodiment of the present application.

FIG. 12 is a schematic diagram of a structure of a system according to an embodiment of this application. As shown in FIG. 12, the system 1200 includes a vehicle 1202 and a server 1201. The vehicle 1202 includes a video call system 1203, and the video call system 1203 includes a processor 1204 and a communications apparatus 1205.

The server 1201 is configured to obtain a 3D head image of a user based on a face image of the user.

The communications apparatus 1205 is configured to obtain the 3D head image of the user from the server 1201, and transmit the 3D head image of the user to the processor.

The processor 1204 is configured to obtain a key feature point of a facial expression of the user based on the face image of the user in a video call process, drive the 3D head image of the user by using the key feature point of the facial expression of the user, to obtain a target 3D avatar of the user, where the target 3D avatar of the user has an expression of the user, rotate the target 3D avatar based on a preset presentation angle, to obtain a target 3D avatar at the preset presentation angle, and transmit the target 3D avatar at the preset presentation angle to the communications apparatus.

The communications apparatus 1205 is configured to send the target 3D avatar at the preset presentation angle to a peer video call device.

In a feasible embodiment, the server 1201 is further configured to construct the 3D head image of the user based on the face image of the user.

In a feasible embodiment, the face image of the user includes N infrared images of the user, and N is an integer greater than 0, and in an aspect of constructing the 3D head image of the user based on the face image of the user, the server 1201 is further configured to obtain first 3D head point cloud information of the user based on the N infrared images of the user, and construct the 3D head image of the user based on the first 3D head point cloud information of the user.

In a feasible embodiment, the face image of the user includes N infrared images of the user and a color face image of the user, and N is an integer greater than 0, and in an aspect of constructing the 3D head image of the user based on the face image of the user, the server 1201 is further configured to obtain second 3D head point cloud information of the user based on the N infrared images of the user and the color face image of the user, and construct the 3D head image of the user based on the second 3D head point cloud information of the user.

In a feasible embodiment, the face image of the user further includes the color face image of the user, and the server 1201 is further configured to obtain a face texture feature of the user based on the color face image of the user.

In an aspect of constructing the 3D head image of the user based on the face image of the user, the server 1201 is further configured to construct the 3D head image of the user based on the 3D head point cloud information of the user and the face texture feature of the user, where the 3D head image of the user is a color image, and the 3D head point cloud information of the user includes the first 3D head point cloud information of the user or the second 3D head point cloud information of the user.

In a feasible embodiment, the face image of the user includes N infrared images of the user and a color face image of the user, and in an aspect of constructing the 3D head image of the user based on the face image of the user, the server 1201 is further configured to input the color face image of the user and the N infrared images of the user into a feature extraction model for calculation, to obtain 3D head point cloud information of the user and a face texture feature of the user, and construct the 3D head image of the user based on the 3D head point cloud information of the user and the face texture feature of the user, where the 3D head image of the user is a color image.

In a feasible embodiment, the feature extraction model includes a 3D head feature extraction network and a texture feature extraction network, and in an aspect of inputting the color face image of the user and the N infrared images of the user into a feature extraction model for calculation, to obtain 3D head point cloud information of the user and a face texture feature of the user, the server 1201 is further configured to input the color face image of the user and the N infrared images of the user into the 3D head feature extraction network for calculation, to obtain the 3D head point cloud information of the user, and input the color face image of the user into the texture feature extraction network for calculation, to obtain the face texture feature of the user.

In a feasible embodiment, the 3D head feature extraction network is a neural network that uses an encoder-decoder architecture, and in an aspect of inputting the color face image of the user and the N infrared images of the user into the 3D head feature extraction network for calculation, to obtain the 3D head point cloud information of the user, the server 1201 is further configured to obtain N image pairs based on the color face image of the user and the N infrared images of the user, where each of the N image pairs includes a color image and an infrared image of the user, the color image in the N image pairs is the color face image of the user, and infrared images in the N image pairs are respectively from the N infrared images of the user, and input the N image pairs into the neural network with the encoder-decoder architecture for calculation, to obtain the 3D head point cloud information of the user.

In a feasible embodiment, the preset presentation angle is obtained based on the N infrared images of the user.

In a feasible embodiment, the server 1201 is further configured to obtain the 3D head image of the user based on a color depth image.

In an aspect of obtaining the 3D head image of the user based on a color depth image, the server 1201 is further configured to obtain 3D head point cloud information of the user and a face texture feature of the user based on the color depth image, and construct the 3D head image of the user based on the 3D head point cloud information of the user and the face texture feature of the user, where the 3D head image of the user is a color image.

Further, the preset presentation angle is obtained based on the color depth image.

It should be noted herein that, for a specific process in which the server 1201 obtains the 3D head image of the user based on the face image of the user, refer to the related descriptions in step S302. Details are not described herein again. Certainly, a specific manner in which the server 1201 obtains the 3D head image of the user is not limited to the present application.

Figure 13:
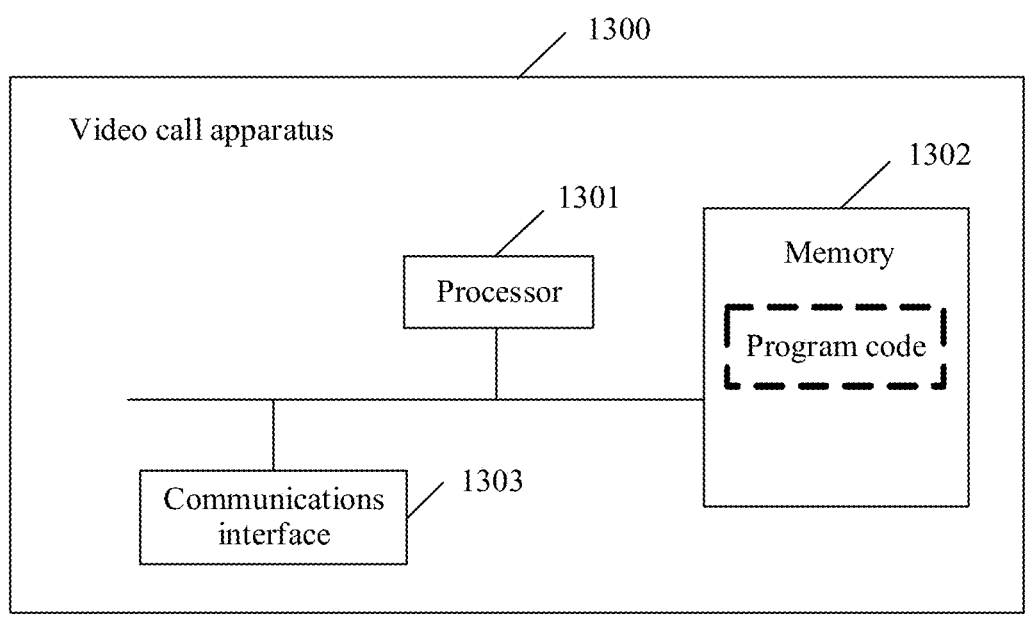
FIG. 13 is a schematic diagram of a structure of another video call apparatus according to an embodiment of the present application.

The video call apparatus 1300 shown in FIG. 13 may be implemented in a structure in FIG. 13. The video call apparatus 1300 includes at least one processor 1301, at least one memory 1302, and at least one communications interface 1303. The processor 1301, the memory 1302, and the communications interface 1303 are connected and communicate with each other through a communications bus.

The processor 1301 may be a general-purpose CPU, a microprocessor, an ASIC, or one or more integrated circuits for controlling program execution of the foregoing solution.

The communications interface 1303 is configured to communicate with another device or a communications network such as the Ethernet, a radio access network (RAN), or a WLAN.

The memory 1302 may be a read-only memory (ROM), another type of static storage device that can store static information and an instruction, a random-access memory (RAM), or another type of dynamic storage device that can store information and an instruction, or may be an electrically erasable programmable ROM (EEPROM), a compact disc (CD) ROM (CD-ROM) or another compact disc storage, an optical disc storage (including a compact disc, a laser disc, an optical disc, a DIGITAL VERSATILE DISC (DVD), a BLU-RAY disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor through the bus. The memory may alternatively be integrated with the processor.

The memory 1302 is configured to store application program code for executing the foregoing solutions, and the processor 1301 controls the execution. The processor 1301 is configured to execute the application program code stored in the memory 1302.

The code stored in the memory 1302 may be used to perform any one of the foregoing methods for presenting a face in a video call, for example, obtaining a key feature point of a facial expression of a user based on a face image of the user in a video call process, driving a 3D head image of the user by using the key feature point of the facial expression of the user, to obtain a target 3D avatar of the user, where the target 3D avatar of the user has an expression of the user, rotating the target 3D avatar based on a preset target presentation angle, to obtain a target 3D avatar at the preset presentation angle, and transmitting the target 3D avatar at the preset presentation angle to a peer video call device through the communications interface 1303.

An embodiment of the present application further provides a computer storage medium. The computer storage medium may store a program, and when the program is executed, some or all of the steps of any one of the methods for presenting a face in a video call in the foregoing method embodiments are performed.

Figure 14:
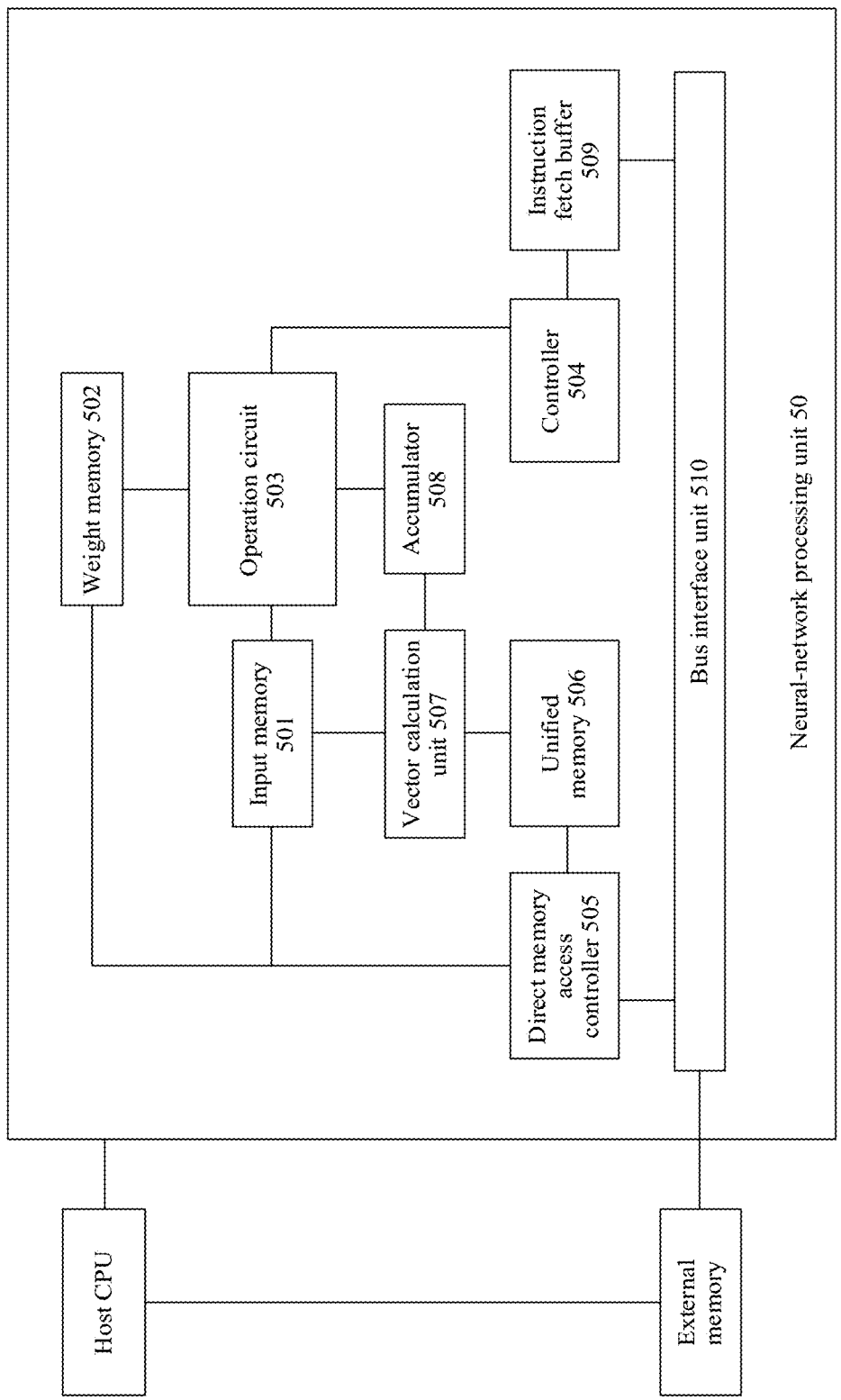
FIG. 14 is a schematic diagram of a structure of a neural-network processing unit according to an embodiment of the present application.

FIG. 14 is a structural diagram of hardware of a chip according to an embodiment of the present application.

As a coprocessor, a neural-network processing unit (NPU) 50 is mounted to a host CPU, and the host CPU assigns a task. A core part of the NPU is an operation circuit 503, and a controller 504 controls the operation circuit 503 to extract data in a memory (a weight memory or an input memory) and perform an operation.

In some implementations, the operation circuit 503 includes a plurality of process engines (PEs). In some implementations, the operation circuit 503 is a two-dimensional systolic array. The operation circuit 503 may alternatively be a one-dimensional systolic array or another electronic circuit that can perform mathematical operations such as multiplication and addition. In some implementations, the operation circuit 503 is a general-purpose matrix processor.

For example, it is assumed that there are an input matrix A, a weight matrix B, and an output matrix C. The operation circuit fetches data corresponding to the matrix B from a weight memory 502, and caches the data on each PE in the operation circuit. The operation circuit fetches data corresponding to the matrix A from an input memory 501, performs a matrix operation on the matrix B, and stores an obtained partial result or an obtained final result of the matrix in an accumulator 508.

A vector calculation unit 507 may perform further processing such as vector multiplication, vector addition, an exponent operation, a logarithm operation, or value comparison on an output of the operation circuit. For example, the vector calculation unit 507 may be configured to perform network calculation, such as pooling, batch normalization, or local response normalization, at a non-convolutional/non-fully connected (FC) layer in a neural network.

In some implementations, the vector calculation unit 507 can store a processed output vector in a unified buffer 506. For example, the vector calculation unit 507 can apply a non-linear function to an output of the operation circuit 503, for example, a vector of an accumulated value, so as to generate an activated value. In some implementations, the vector calculation unit 507 generates a normalized value, a combined value, or both a normalized value and a combined value. In some implementations, the processed output vector can be used as an activated input to the operation circuit 503, for example, can be used at a subsequent layer in the neural network.

A feature extraction process in this embodiment of this application, for example, extracting 3D head point cloud information of a user from a color face image and an infrared image and extracting a face texture feature of the user from the color face image, may be performed by the vector calculation unit 507 or the operation circuit 503.

The unified memory 506 is configured to store input data and output data.

A direct memory access controller (DMAC) 505 transfers input data in an external memory to the input memory 501 and/or the unified memory 506, stores weight data in the external memory in the weight memory 502, and stores data in the unified memory 506 in the external memory.

A bus interface unit (BIU) 510 is configured to implement interaction between the host CPU, the DMAC, and an instruction fetch buffer 509 through a bus.

The instruction fetch buffer 509 connected to the controller 504 is configured to store an instruction used by the controller 504.

The controller 504 is configured to invoke the instruction buffered in the instruction fetch buffer 509, to control a working process of an operation accelerator.

The controller 504 invokes the instruction buffered in the instruction fetch buffer 509, to implement the feature extraction process in this embodiment of this application, for example, extracting the 3D head point cloud information of the user from the color face image and the infrared image and extracting the face texture feature of the user from the color face image.

The vector calculation unit 507 includes a plurality of operation processing units, and if necessary, performs further processing such as vector multiplication, vector addition, an exponent operation, a logarithm operation, or value comparison on an output of the operation circuit. The vector calculation unit 507 is mainly configured to perform network calculation at a non-convolutional/FC layer in a neural network, for example, pooling, batch normalization, or local response normalization.

In some implementations, the vector calculation unit 507 can store a processed output vector in a unified buffer 506. For example, the vector calculation unit 507 can apply a non-linear function to an output of the operation circuit 503, for example, a vector of an accumulated value, so as to generate an activated value. In some implementations, the vector calculation unit 507 generates a normalized value, a combined value, or both a normalized value and a combined value. In some implementations, the processed output vector can be used as an activated input to the operation circuit 503, for example, can be used at a subsequent layer in the neural network.

The instruction fetch buffer 509 connected to the controller 504 is configured to store an instruction used by the controller 504.

Usually, the unified memory 506, the input memory 501, the weight memory 502, and the instruction fetch buffer 509 each are an on-chip memory. The external memory is a memory outside the NPU. The external memory may be a double data rate (DDR) synchronous dynamic RAM (SDRAM), a high bandwidth memory HBM), or another readable and writable memory.

The host CPU performs steps such as obtaining a key feature point of a facial expression of a user based on a face image of the user in a video call process, driving a 3D head image of the user by using the key feature point of the facial expression of the user, to obtain a target 3D avatar of the user, where the target 3D avatar of the user has an expression of the user, rotating the target 3D avatar based on a preset target presentation angle, to obtain a target 3D avatar at the preset presentation angle, and sending the target 3D avatar at the preset presentation angle to a peer video call device.

Figure 15:
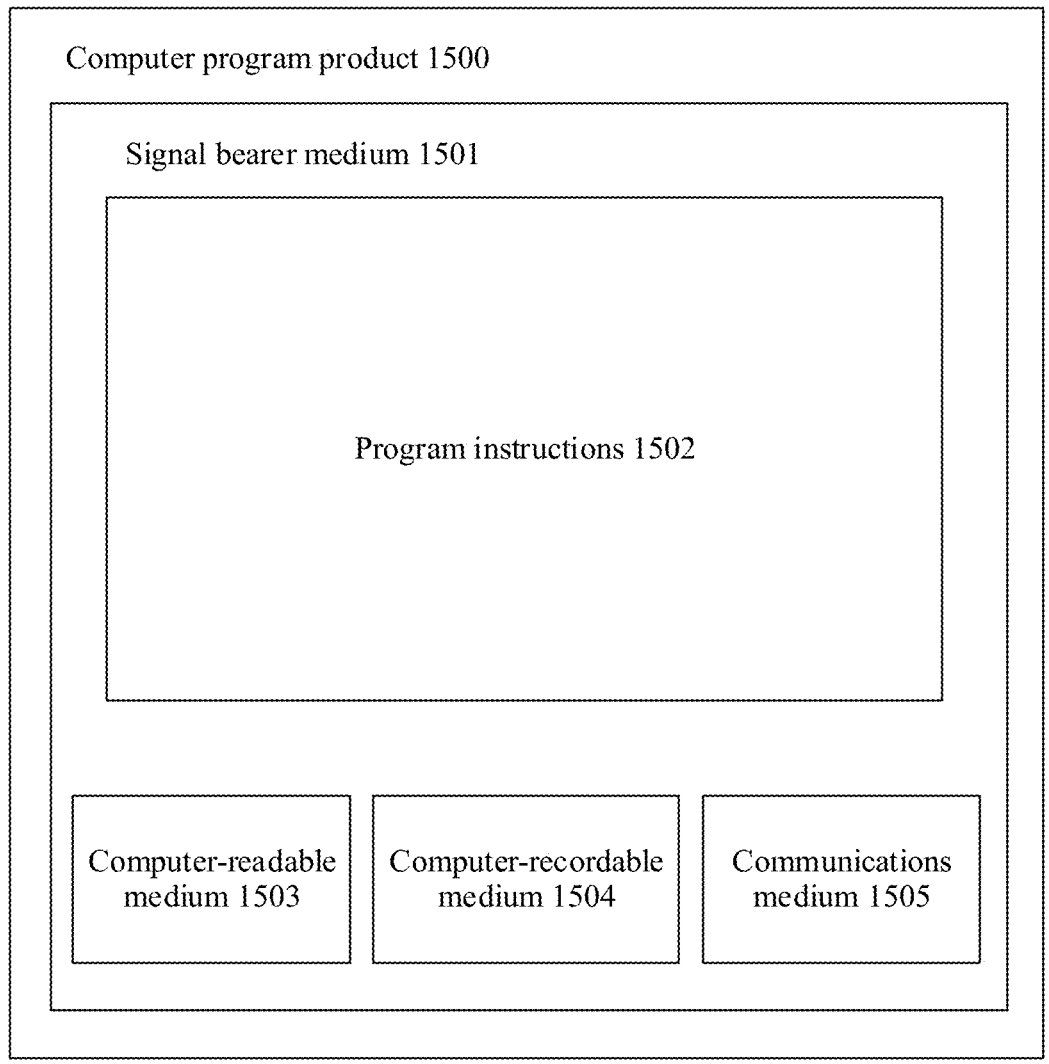
FIG. 15 is a schematic diagram of a structure of a computer program product according to an embodiment of the present application.

In some embodiments, the disclosed method may be implemented as computer program instructions encoded in a machine-readable format on a computer-readable storage medium or encoded on another non-transitory medium or product. FIG. 15 schematically shows a conceptual partial view of an example computer program product arranged according to at least some embodiments shown herein. The example computer program product includes a computer program for executing a computer process on a computing device. In an embodiment, the example computer program product 1500 is provided by using a signal bearer medium 1501. The signal bearer medium 1501 may include one or more program instructions 1502. When the one or more program instructions are run by one or more processors, the functions or some of the functions described above with respect to FIG. 3, FIG. 6, FIG. 7, and FIG. 9 may be provided. In addition, the program instructions 1502 in FIG. 15 are also described as example instructions.

In some examples, the signal bearer medium 1501 may include a computer-readable medium 1503, for example but not limited to, a hard disk drive, a CD, a DVD, a digital tape, a memory, a ROM, or a RAM. In some implementations, the signal bearer medium 1501 may include a computer-recordable medium 1504, for example but not limited to, a memory, a read/write (R/W) CD, or an R/W DVD. In some implementations, the signal bearer medium 1501 may include a communications medium 1505, for example but not limited to, a digital and/or analog communications medium (for example, an optical fiber, a waveguide, a wired communications link, or a wireless communications link). Therefore, for example, the signal bearer medium 1501 may be conveyed by the communications medium 1505 in a wireless form (for example, a wireless communications medium that complies with the Institute of Electrical and Electronics Engineers (IEEE) 802.11 standard or another transmission protocol). The one or more program instructions 1502 may be, for example, one or more computer-executable instructions or logic implementation instructions. In some examples, a computing device described with respect to FIG. 3, FIG. 6, FIG. 7, and FIG. 9 may be configured to provide various operations, functions, or actions in response to the program instructions 1502 transferred to the computing device by using one or more of the computer-readable medium 1503, the computer-recordable medium 1504, and/or the communications medium 1505. It should be understood that the arrangement described herein is merely used as an example. Therefore, a person skilled in the art understands that another arrangement and another element (for example, a machine, an interface, a function, a sequence, and a functional group) can be used to replace the arrangement, and some elements may be omitted together depending on an expected result. In addition, many of the described elements are functional entities that can be implemented as discrete or distributed components, or implemented in any suitable combination at any suitable location in combination with another component.

It should be noted that, for ease of description, the foregoing method embodiments are expressed as a series of actions. However, a person skilled in the art should appreciate that the present application is not limited to the described action sequence, because according to the present application, some steps may be performed in other sequences or performed simultaneously. In addition, a person skilled in the art should also know that all the embodiments described in the specification are preferred embodiments, and the related actions and modules are not necessarily mandatory to the present application.

In the foregoing embodiments, descriptions of the embodiments have respective focuses. For a part that is not described in detail in an embodiment, refer to related descriptions in other embodiments.

In the several embodiments provided in this application, it should be understood that the disclosed apparatuses may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present application essentially, or the part contributing to the conventional technology, or all or some of the technical solutions may be implemented in the form of a software product. The computer software product is stored in a memory and includes several instructions for instructing a computer device (which may be a personal computer, a server, a network device, or the like) to perform all or some of the steps of the methods described in the embodiments of the present application. The foregoing memory includes any medium that can store program code, for example, a Universal Serial Bus (USB) flash drive, a ROM, a RAM, a removable hard disk, a magnetic disk, or an optical disc.

A person of ordinary skill in the art may understand that all or some of the steps of the methods in the embodiments may be implemented by a program instructing related hardware. The program may be stored in a computer-readable memory. The memory may include a flash memory, a ROM, a RAM, a magnetic disk, an optical disc, or the like.

The embodiments of the present application are described in detail above. The principle and implementation of the present application are described in this specification by using specific examples. The description about the embodiments is merely provided to help understand the method and core ideas of the present application. In addition, a person of ordinary skill in the art makes variations to the present application in terms of the specific implementations and application scopes based on the ideas of the present application. Therefore, the content of this specification shall not be construed as a limitation on the present application.

What is claimed is:

1. A method comprising:
    obtaining, based on a face image of a user in a video call process, a key feature point of a facial expression of the user, wherein the face image comprises N infrared images of the user and a color face image of the user, and wherein N is an integer greater than 0;
    obtaining, based on the N infrared images and the color face image, a three-dimensional (3D) head point cloud information of the user;
    constructing, based on the 3D head point cloud information, a 3D head image of the user;
    driving, using the key feature point, the 3D head image to obtain a first target 3D avatar of the user, wherein the first target 3D avatar has an expression of the user;
    rotating, based on a preset presentation angle, the first target 3D avatar to obtain a second target 3D avatar at the preset presentation angle; and
    sending, to a peer video call device, the second target 3D avatar.

2. The method of claim 1, further comprising:
    obtaining, based on the color face image, a face texture feature of the user; and
    further constructing, based on the face texture feature, the 3D head image that is a color image, wherein the 3D head point cloud information comprises first 3D head point cloud information of the user or second 3D head point cloud information of the user.

3. The method of claim 1, further comprising:
    inputting the color face image and the N infrared images into a feature extraction model to obtain 3D head point cloud information of the user and a face texture feature of the user; and
    further constructing, based on the 3D head point cloud information and the face texture feature, the 3D head image that is a color image.

4. The method of claim 3, wherein the feature extraction model comprises a 3D head feature extraction network and a texture feature extraction network, and wherein the method further comprises:
    further inputting the color face image and the N infrared images into the 3D head feature extraction network to obtain the 3D head point cloud information; and
    inputting the color face image into the texture feature extraction network to obtain the face texture feature.

5. An apparatus comprising:
    a non-transitory memory configured to store instructions; and
    a processor coupled to the non-transitory memory, wherein when executed by the processor, the instructions cause the apparatus to:
        obtain, based on a face image of a user in a video call process, a key feature point of a facial expression of the user, wherein the face image comprises N infrared images of the user and a color face image of the user, and wherein N is an integer greater than 0;
        obtain, based on the N infrared images and the color face image, a three-dimensional (3D) head point cloud information of the user;
        construct, based on the 3D head point cloud information, a 3D head image of the user;
        drive, using the key feature point, the 3D head image to obtain a first target 3D avatar of the user, wherein the first target 3D avatar has an expression of the user;
        rotate, based on a preset presentation angle, the first target 3D avatar to obtain a second target 3D avatar at the preset presentation angle; and
        send, to a peer video call device, the second target 3D avatar.

6. The apparatus of claim 5, wherein when executed by the processor, the instructions further cause the apparatus to:
    obtain, based on the color face image, a face texture feature of the user; and
    further construct, based on the face texture feature, the 3D head image that is a color image, wherein the 3D head point cloud information comprises first 3D head point cloud information of the user or second 3D head point cloud information of the user.

7. The apparatus of claim 5, wherein when executed by the processor, the instructions further cause the apparatus to:
    input the color face image and the N infrared images into a feature extraction model to obtain 3D head point cloud information of the user and a face texture feature of the user; and
    further construct, based on the 3D head point cloud information and the face texture feature, the 3D head image that is a color image.

8. The apparatus of claim 7, wherein the feature extraction model comprises a 3D head feature extraction network and a texture feature extraction network, and wherein when executed by the processor, the instructions further cause the apparatus to:
    input the color face image and the N infrared images into the 3D head feature extraction network to obtain the 3D head point cloud information; and
    input the color face image into the texture feature extraction network to obtain the face texture feature.

9. The apparatus of claim 8, wherein the 3D head feature extraction network is a neural network that uses an encoder-decoder architecture, and wherein when executed by the processor, the instructions further cause the apparatus to:
    obtain, based on the color face image and the N infrared images, N image pairs, wherein each of the N image pairs comprises the color face image and an infrared image of the user from the N infrared images; and
    input the N image pairs into the neural network to obtain the 3D head point cloud information.

10. The apparatus of claim 9, wherein when executed by the processor, the instructions further cause the apparatus to obtain, based on the N infrared images, the preset presentation angle.

11. The apparatus of claim 5, wherein the face image is a color depth image, and wherein when executed by the processor, the instructions further cause the apparatus to:
obtain, based on the color depth image, 3D head point cloud information of the user and a face texture feature of the user; and
construct, based on the 3D head point cloud information and the face texture feature, the 3D head image that is a color image.

12. The apparatus of claim 11, wherein when executed by the processor, the instructions further cause the apparatus to obtain, based on the color depth image, the preset presentation angle.

13. A vehicle comprising:
a video call system comprising:
a processor configured to:
obtain, based on a face image of a user in a video call process, a key feature point of a facial expression of the user, wherein the face image comprises N infrared images of the user and a color face image of the user, and wherein N is an integer greater than 0;
obtain, based on the N infrared images and the color face image, a three-dimensional (3D) head point cloud information of the user;
construct, based on the 3D head point cloud information, a 3D head image of the user;
drive, using the key feature point, the 3D head image to obtain a first target 3D avatar of the user, wherein the first target 3D avatar of the user has an expression of the user;
rotate, based on a preset presentation angle, the first target 3D avatar to obtain a second target 3D avatar at the preset presentation angle; and
transmit the second target 3D avatar; and
a communications apparatus coupled to the processor and configured to:
receive the second target 3D avatar; and
send, to a peer video call device, the second target 3D avatar.

14. The vehicle of claim 13, wherein the processor is further configured to:
obtain, based on the color face image, a face texture feature of the user; and
further construct, based on the face texture feature, the 3D head image that is a color image, wherein the 3D head point cloud information comprises first 3D head point cloud information of the user or second 3D head point cloud information of the user.

15. The vehicle of claim 13, wherein the processor is further configured to:
input the color face image and the N infrared images into a feature extraction model to obtain 3D head point cloud information of the user and a face texture feature of the user; and
further construct, based on the 3D head point cloud information and the face texture feature, the 3D head image that is a color image.

16. The vehicle of claim 15, wherein the feature extraction model comprises a 3D head feature extraction network and a texture feature extraction network, and wherein the processor is further configured to:
input the color face image and the N infrared images into the 3D head feature extraction network to obtain the 3D head point cloud information; and
input the color face image into the texture feature extraction network to obtain the face texture feature.

17. The vehicle of claim 16, wherein the 3D head feature extraction network is a neural network that uses an encoder-decoder architecture, and wherein the processor is further configured to:
obtain, based on the color face image and the N infrared images, N image pairs, wherein each of the N image pairs comprises the color face image and an infrared image of the user from the N infrared images; and
input the N image pairs into the neural network to obtain the 3D head point cloud information.

18. The vehicle of claim 13, wherein the processor is further configured to obtain, based on the N infrared images, the preset presentation angle.

19. The vehicle of claim 13, wherein the video call system further comprises an infrared camera coupled to the processor and configured to:
obtain the N infrared images of the user; and
transmit the N infrared images to the processor.

20. The vehicle of claim 13, wherein the processor is further configured to:
obtain, based on a color depth image, 3D head point cloud information of the user and a face texture feature of the user; and
construct, based on the 3D head point cloud information and the face texture feature, the 3D head image that is a color image.

21. The vehicle of claim 20, wherein the processor is further configured to obtain, based on the color depth image, the preset presentation angle.

* * * * *